US010681372B2

(12) United States Patent
Li et al.

(10) Patent No.: US 10,681,372 B2
(45) Date of Patent: Jun. 9, 2020

(54) ENCODER DECISIONS BASED ON RESULTS OF HASH-BASED BLOCK MATCHING

(71) Applicants: Microsoft Technology Licensing, LLC, Redmond, WA (US); Bin Li, Beijing (CN); Jizheng Xu, Beijing (CN)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/321,536

(22) PCT Filed: Jun. 23, 2014

(86) PCT No.: PCT/CN2014/080481
§ 371 (c)(1),
(2) Date: Dec. 22, 2016

(87) PCT Pub. No.: WO2015/196322
PCT Pub. Date: Dec. 30, 2015

(65) Prior Publication Data
US 2017/0163999 A1 Jun. 8, 2017

(51) Int. Cl.
*H04N 19/103* (2014.01)
*H04N 19/517* (2014.01)
(Continued)

(52) U.S. Cl.
CPC ........... *H04N 19/52* (2014.11); *H04N 19/105* (2014.11); *H04N 19/117* (2014.11);
(Continued)

(58) Field of Classification Search
CPC .... H04N 19/593; H04N 19/136; H04N 19/46; H04N 19/176; H04N 19/105;
(Continued)

(56) References Cited

U.S. PATENT DOCUMENTS 2,239,538 A 4/1941 Richter
2,718,173 A 9/1955 Hacman et al.
(Continued)

FOREIGN PATENT DOCUMENTS

CN 1857001 11/2006
CN 1874487 12/2006
(Continued)

OTHER PUBLICATIONS

ITU-T, "Series H: Audiovisual and Multimedia Systems Infrastructure of audiovisual services—Coding of moving video—High efficiency video coding" (Apr. 2013).*
(Continued)

*Primary Examiner* — Philip P. Dang
(74) *Attorney, Agent, or Firm* — Klarquist Sparkman, LLP

(57) ABSTRACT

Innovations in encoder-side decisions that use the results of hash-based block matching when setting parameters are presented. For example, some of the innovations relate to ways to select motion vector precision depending on the results of hash-based block matching. Other innovations relate to ways to selectively disable sample adaptive offset filtering depending on the results of hash-based block matching. Still other innovations relate to ways to select which reference pictures to retain in a reference picture set depending on the results of hash-based block matching.

19 Claims, 17 Drawing Sheets

(51) Int. Cl.
*H04N 19/557* (2014.01)
*H04N 19/52* (2014.01)
*H04N 19/105* (2014.01)
*H04N 19/176* (2014.01)
*H04N 19/117* (2014.01)
*H04N 19/137* (2014.01)
*H04N 19/523* (2014.01)
*H04N 19/433* (2014.01)
*H04N 19/70* (2014.01)

(52) U.S. Cl.
CPC ......... *H04N 19/137* (2014.11); *H04N 19/176* (2014.11); *H04N 19/433* (2014.11); *H04N 19/523* (2014.11); *H04N 19/70* (2014.11)

(58) Field of Classification Search
CPC ...... H04N 19/70; H04N 19/97; H04N 1/4486; H04N 1/4466; H04N 19/44
See application file for complete search history.

(56) References Cited

U.S. PATENT DOCUMENTS

| | | | |
|---|---|---|---|
| 3,059,528 A | 10/1962 | Allan | |
| 3,142,236 A | 7/1964 | Siegmund et al. | |
| 3,642,351 A | 2/1972 | Tronnier et al. | |
| 4,918,583 A | 4/1990 | Kudo et al. | |
| 5,016,980 A | 5/1991 | Waldron | |
| 5,565,921 A * | 10/1996 | Sasaki | H04N 19/159 375/240.13 |
| 5,610,841 A | 3/1997 | Tanaka et al. | |
| 5,613,004 A * | 3/1997 | Cooperman | G06T 1/0021 348/E7.056 |
| 5,687,236 A * | 11/1997 | Moskowitz | G06T 1/0021 348/E7.056 |
| 5,689,365 A | 11/1997 | Takahashi | |
| 5,774,271 A | 6/1998 | Lagerway et al. | |
| 5,850,312 A | 12/1998 | Kato et al. | |
| 6,332,092 B1 | 12/2001 | Deckert et al. | |
| 6,487,440 B2 | 11/2002 | Deckert et al. | |
| 6,618,197 B1 | 9/2003 | Hayakawa | |
| 6,879,266 B1 | 4/2005 | Dye et al. | |
| 6,894,289 B2 | 5/2005 | Nilson et al. | |
| 6,904,110 B2 * | 6/2005 | Trans | H04B 1/00 375/229 |
| 6,915,387 B1 | 7/2005 | Huffman et al. | |
| 6,938,128 B1 | 8/2005 | Kuskin et al. | |
| 6,983,020 B2 * | 1/2006 | Christiansen | G06F 9/004 375/240.16 |
| 6,995,918 B2 | 2/2006 | Terasawa et al. | |
| 7,046,460 B2 | 5/2006 | Nozawa | |
| 7,206,346 B2 | 4/2007 | Shimizu et al. | |
| 7,216,232 B1 * | 5/2007 | Cox | G06T 1/0021 713/176 |
| 7,239,454 B2 | 7/2007 | Kobayashi et al. | |
| 7,325,141 B2 | 1/2008 | Chow et al. | |
| 7,328,153 B2 | 2/2008 | Wells et al. | |
| 7,349,583 B2 | 3/2008 | Kumar et al. | |
| 7,379,499 B2 | 5/2008 | Dahlhoff et al. | |
| 7,400,774 B2 | 7/2008 | Puri et al. | |
| 7,421,128 B2 | 9/2008 | Venkatesan et al. | |
| 7,430,670 B1 * | 9/2008 | Horning | G06F 21/14 713/190 |
| 7,466,418 B2 | 12/2008 | Nilson et al. | |
| 7,606,974 B2 | 10/2009 | Dai et al. | |
| 7,609,763 B2 | 10/2009 | Mukerjee et al. | |
| 7,613,364 B2 | 11/2009 | Kang et al. | |
| 7,636,824 B1 | 12/2009 | Tormasov | |
| 7,672,005 B1 | 3/2010 | Hobbs et al. | |
| 7,702,127 B2 * | 4/2010 | Mihcak | G06T 1/0028 382/100 |
| 7,706,682 B2 | 4/2010 | Keller et al. | |
| 7,733,497 B2 | 6/2010 | Yun et al. | |
| 7,747,584 B1 * | 6/2010 | Jernigan, IV | G06F 17/30156 707/692 |
| 7,761,712 B2 * | 7/2010 | Moskowitz | G06T 1/0021 380/28 |
| 7,868,792 B2 | 1/2011 | Artan et al. | |
| 7,870,393 B2 * | 1/2011 | Moskowitz | G06T 1/0021 380/205 |
| 7,873,786 B1 | 1/2011 | Singh et al. | |
| 7,912,244 B2 * | 3/2011 | Mihcak | G06T 1/0028 382/100 |
| 7,949,186 B2 * | 5/2011 | Grauman | G06K 9/4671 382/159 |
| 7,986,844 B2 | 7/2011 | Diamant et al. | |
| 8,003,186 B2 | 8/2011 | Ishizaki et al. | |
| 8,005,142 B2 | 8/2011 | Kim et al. | |
| 8,041,677 B2 * | 10/2011 | Sumner | G06F 11/1453 707/640 |
| 8,086,052 B2 * | 12/2011 | Toth | H04N 19/52 382/232 |
| 8,099,415 B2 * | 1/2012 | Luo | G06F 17/30569 707/736 |
| 8,099,601 B2 * | 1/2012 | Serret-Avila | G06T 1/0071 713/170 |
| 8,107,527 B1 | 1/2012 | Hobbs et al. | |
| 8,126,282 B2 | 2/2012 | Jung et al. | |
| 8,197,397 B2 | 6/2012 | Rovegno | |
| 8,213,503 B2 | 7/2012 | Tu et al. | |
| 8,213,515 B2 * | 7/2012 | Kudana | H04N 19/176 375/240.17 |
| 8,264,489 B2 | 9/2012 | Saint-Hilaire et al. | |
| 8,284,484 B2 | 10/2012 | Hoult et al. | |
| 8,295,617 B2 | 10/2012 | Collins | |
| 8,320,683 B2 | 11/2012 | Konishi | |
| 8,335,255 B2 | 12/2012 | Lee et al. | |
| 8,355,437 B2 * | 1/2013 | Hannuksela | H04N 19/172 375/240.12 |
| 8,411,750 B2 | 4/2013 | Dane | |
| 8,417,039 B2 | 4/2013 | Albu et al. | |
| 8,442,942 B2 | 5/2013 | Leppard | |
| 8,515,123 B2 * | 8/2013 | Thorwirth | G06T 1/0092 382/100 |
| 8,619,857 B2 | 12/2013 | Zhao et al. | |
| 8,644,620 B1 | 2/2014 | Lam | |
| 8,681,870 B2 | 3/2014 | Takada | |
| 8,787,460 B1 | 7/2014 | Hobbs | |
| 8,897,512 B1 | 11/2014 | Bozinovic et al. | |
| 9,167,020 B2 | 10/2015 | Abdo et al. | |
| 9,223,534 B1 | 12/2015 | Eilam | |
| 9,225,979 B1 | 12/2015 | Jia et al. | |
| 9,235,313 B2 | 1/2016 | Wu et al. | |
| 9,277,237 B2 | 3/2016 | Abiezzi et al. | |
| 9,286,862 B2 | 3/2016 | Peacock | |
| 9,332,270 B2 | 5/2016 | Ju | |
| 2001/0001614 A1 | 5/2001 | Boice et al. | |
| 2002/0041629 A1 * | 4/2002 | Hannuksela | H04N 19/172 375/240.12 |
| 2002/0118755 A1 | 8/2002 | Karczewicz et al. | |
| 2003/0179206 A1 | 9/2003 | Emerson et al. | |
| 2003/0179951 A1 | 9/2003 | Christiansen | |
| 2003/0187587 A1 | 10/2003 | Swindells et al. | |
| 2004/0131014 A1 | 7/2004 | Thompson et al. | |
| 2004/0133548 A1 | 7/2004 | Fielding et al. | |
| 2004/0174570 A1 | 9/2004 | Plunkett et al. | |
| 2004/0223549 A1 | 11/2004 | Karczewicz et al. | |
| 2005/0060643 A1 | 3/2005 | Glass et al. | |
| 2005/0166040 A1 * | 7/2005 | Walmsley | B41J 2/04505 713/150 |
| 2006/0062303 A1 | 3/2006 | Xu | |
| 2006/0132931 A1 | 6/2006 | Epple et al. | |
| 2006/0153295 A1 | 7/2006 | Wang et al. | |
| 2006/0224594 A1 * | 10/2006 | Goyal | G06F 17/30008 |
| 2007/0025442 A1 | 2/2007 | Okada et al. | |
| 2007/0036226 A1 | 2/2007 | Kim et al. | |
| 2007/0041066 A1 | 2/2007 | Yasuda et al. | |
| 2007/0053662 A1 | 3/2007 | Tobita et al. | |
| 2007/0086526 A1 * | 4/2007 | Koto | H04B 1/662 375/240.16 |
| 2007/0092147 A1 | 4/2007 | Guionnet et al. | |
| 2007/0116110 A1 | 5/2007 | Diamant et al. | |
| 2007/0199011 A1 | 8/2007 | Zhang et al. | |

(56) References Cited

U.S. PATENT DOCUMENTS

| | | | |
|---|---|---|---|
| 2007/0217702 A1* | 9/2007 | Sung | H04N 19/176 382/236 |
| 2008/0104652 A1 | 5/2008 | Swenson et al. | |
| 2008/0212687 A1 | 9/2008 | Liu | |
| 2009/0022374 A1 | 1/2009 | Boult | |
| 2009/0115909 A1 | 5/2009 | Walls et al. | |
| 2009/0129466 A1 | 5/2009 | Cho et al. | |
| 2009/0244299 A1 | 10/2009 | Fukunishi | |
| 2010/0057750 A1 | 3/2010 | Aasted et al. | |
| 2010/0119170 A1 | 5/2010 | Sengamedu et al. | |
| 2010/0166073 A1 | 7/2010 | Schmit et al. | |
| 2010/0177893 A1 | 7/2010 | Jeon et al. | |
| 2010/0268836 A1* | 10/2010 | Jabri | H04L 47/38 709/231 |
| 2010/0284460 A1 | 11/2010 | Tsai et al. | |
| 2010/0284471 A1 | 11/2010 | Tsai et al. | |
| 2010/0293248 A1 | 11/2010 | Kamay et al. | |
| 2011/0007801 A1 | 1/2011 | Andersson et al. | |
| 2011/0010396 A1 | 1/2011 | Zhou | |
| 2011/0044551 A1 | 2/2011 | Lee et al. | |
| 2011/0051809 A1 | 3/2011 | Lee | |
| 2011/0128810 A1* | 6/2011 | Sato | G06F 9/345 365/230.06 |
| 2011/0179341 A1 | 7/2011 | Falls et al. | |
| 2011/0225114 A1 | 9/2011 | Gotthardt | |
| 2011/0243234 A1* | 10/2011 | Kondo | H04N 19/61 375/240.16 |
| 2011/0293013 A1 | 12/2011 | Ma et al. | |
| 2011/0299785 A1 | 12/2011 | Albu et al. | |
| 2011/0311042 A1* | 12/2011 | Cheddad | G06F 21/602 380/28 |
| 2012/0057631 A1 | 3/2012 | Le Leannec | |
| 2012/0128064 A1* | 5/2012 | Sato | H04N 19/70 375/240.03 |
| 2012/0170653 A1* | 7/2012 | Panusopone | H04N 19/197 375/240.16 |
| 2012/0213282 A1* | 8/2012 | Choi | H04N 19/597 375/240.16 |
| 2012/0245688 A1 | 9/2012 | Vanaclocha | |
| 2012/0294523 A1 | 11/2012 | Abdo et al. | |
| 2013/0013618 A1* | 1/2013 | Heller | G06F 17/3015 707/747 |
| 2013/0022113 A1 | 1/2013 | Chen et al. | |
| 2013/0034158 A1 | 2/2013 | Kirchhoffer et al. | |
| 2013/0034159 A1* | 2/2013 | Siekmann | H04N 19/176 375/240.12 |
| 2013/0036289 A1* | 2/2013 | Welnicki | G06F 3/0608 711/173 |
| 2013/0057646 A1 | 3/2013 | Chen et al. | |
| 2013/0057666 A1 | 3/2013 | Fujii | |
| 2013/0067344 A1 | 3/2013 | Ungureanu et al. | |
| 2013/0078592 A1 | 3/2013 | McCarthy | |
| 2013/0084018 A1 | 4/2013 | Nystad | |
| 2013/0114704 A1 | 5/2013 | Chen et al. | |
| 2013/0142447 A1 | 6/2013 | Park et al. | |
| 2013/0147974 A1 | 6/2013 | Ju et al. | |
| 2013/0148721 A1* | 6/2013 | Chen | G09G 5/001 375/240.12 |
| 2013/0176560 A1 | 7/2013 | Wax et al. | |
| 2013/0208810 A1 | 8/2013 | Shen et al. | |
| 2013/0243089 A1* | 9/2013 | Lim | H04N 19/176 375/240.12 |
| 2013/0258052 A1 | 10/2013 | Li et al. | |
| 2013/0266073 A1* | 10/2013 | MacInnis | H04N 7/56 375/240.24 |
| 2013/0266078 A1* | 10/2013 | Deligiannis | H04N 19/00533 375/240.25 |
| 2013/0268621 A1* | 10/2013 | Mese | H04N 19/176 709/217 |
| 2013/0271565 A1 | 10/2013 | Chen et al. | |
| 2013/0272394 A1* | 10/2013 | Brockmann | G06T 9/00 375/240.12 |
| 2013/0279564 A1* | 10/2013 | Wang | H04N 19/70 375/240.02 |
| 2013/0279577 A1 | 10/2013 | Schwarz et al. | |
| 2013/0279806 A1 | 10/2013 | Tonisson et al. | |
| 2013/0335527 A1 | 12/2013 | Takahashi et al. | |
| 2014/0002603 A1 | 1/2014 | Takahashi et al. | |
| 2014/0003506 A1 | 1/2014 | Wang et al. | |
| 2014/0010294 A1* | 1/2014 | Ye | H04N 19/70 375/240.12 |
| 2014/0016698 A1 | 1/2014 | Joshi et al. | |
| 2014/0029668 A1 | 1/2014 | Lim et al. | |
| 2014/0050413 A1 | 2/2014 | Sato | |
| 2014/0064360 A1 | 3/2014 | Rapaka et al. | |
| 2014/0092994 A1* | 4/2014 | Wang | H04N 19/70 375/240.26 |
| 2014/0321553 A1 | 10/2014 | Clark | |
| 2014/0369413 A1 | 12/2014 | Clark | |
| 2014/0369421 A1 | 12/2014 | Zhu et al. | |
| 2015/0054946 A1 | 2/2015 | Zhang | |
| 2015/0063451 A1 | 3/2015 | Zhu et al. | |
| 2015/0092840 A1 | 4/2015 | Mochizuki et al. | |
| 2016/0234530 A1 | 8/2016 | Xu et al. | |
| 2016/0241876 A1 | 8/2016 | Xu et al. | |
| 2016/0269732 A1 | 9/2016 | Li et al. | |
| 2016/0277733 A1 | 9/2016 | Li et al. | |
| 2016/0277761 A1 | 9/2016 | Li et al. | |
| 2017/0163999 A1 | 6/2017 | Li et al. | |
| 2017/0302936 A1 | 10/2017 | Li et al. | |
| 2018/0063540 A1 | 3/2018 | Zhu et al. | |
| 2018/0152699 A1 | 5/2018 | Kumar et al. | |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| CN | 105981382 | 5/2019 |
| EP | 1349395 | 10/2003 |
| EP | 2996360 | 3/2016 |
| GB | 2375673 | 11/2002 |
| GB | 2460844 | 12/2009 |
| JP | H11-66301 | 3/1999 |
| JP | 2005-522083 | 7/2005 |
| JP | 2010-508734 | 3/2010 |
| JP | 2013-058873 | 3/2013 |
| RU | 2298226 | 4/2007 |
| WO | WO 00/60874 | 10/2000 |
| WO | WO 02/093934 | 11/2002 |
| WO | WO 2010/085899 | 8/2010 |
| WO | WO 2010/086548 | 8/2010 |
| WO | WO 2011/103206 | 8/2011 |
| WO | WO 2011/153005 | 12/2011 |
| WO | WO 2013/055923 | 4/2013 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | WO 2015/131325 | 9/2015 |
| WO | WO 2015/139165 | 9/2015 |
| WO | WO 2016/018422 | 2/2016 |

OTHER PUBLICATIONS

ITU-T, "Series H: Audiovisual and Multimedia Systems Infrastructure of audiovisual services—Coding of moving video—High efficiency video coding" (Apr. 2013) (Year: 2013).*

Zhenyu Liu et al., "Motion Feature and Hadamard Coefficient-Based Fast Multiple Reference Frame Motion Estimation for H.264", IEEE Transactions on Circuits and Systems for Video Technology, vol. 18, No. 5, May 2008 (Year: 2008).*

(56) References Cited

OTHER PUBLICATIONS

International Preliminary Report on Patentability dated Jan. 5, 2017, from International Patent Application No. PCT/CN2014/080481, 7 pp.

Ascenso et al., "Adaptive Hash-Based Side Information Exploitation for Efficient Wyner-Ziv Video Coding," *IEEE Int'l Conf. on Image Processing*, 4 pp. (Sep. 2007).

Bankoski et al., "VP8 Data Format and Decoding Guide," RFC 6386, 304 pp. (Nov. 2011).

Flynn et al., "High Efficiency Video Coding (HEVC) Range Extensions text specification: Draft 4," JCTVC-N1005, 322 pp. (Apr. 2013).

Flynn et al., "High Efficiency Video Coding (HEVC) Range Extensions text specification: Draft 6," JCTVC-P1005_v1, 355 pp. (Jan. 2014).

Gaikar, "Techinline Remote Desktop Software: Access Your Computers Remotely," *Tricks Machine*, 6 pp. (Jan. 2012).

International Search Report and Written Opinion dated Mar. 2, 2015, from International Patent Application No. PCT/CN2014/080481, 13 pp.

ISO/IEC 11172-2, "Information technology—Coding of moving pictures and associated audio for digital storage media at up to about 1,5 Mbit/s—Part 2: Video," 122 pp. (Aug. 1993).

ISO/IEC 14496-2, "Information Technology—Coding of Audio-Visual Objects: Visual," ISO/IEC JTC1/SC29/WG11 N2202, 327 pp. (Mar. 1998).

ITU-T Recommendation H.261, "Video Codec for Audiovisual Services at p×64 kbits," 29 pp. (Mar. 1993).

ITU-T Recommendation H.262, "Generic Coding of Moving Pictures and Associated Audio Information: Video," 218 pp. (Jul. 1995).

ITU-T Recommendation H.263, "Video coding for low bit rate communication," 167 pp. (Feb. 1998).

ITU-T Recommendation H.264, "Advanced video coding for generic audiovisual services," 680 pp. (Jan. 2012).

ITU-T Recommendation H.265, "High efficiency video coding," 317 pp. (Apr. 2013).

Kwon et al., "AHG5: Fast encoding using early skipping of Intra block copy (IntraBC) search," JCTVC-O0245, 9 pp. (Oct. 2013).

Li et al., "Description of screen content coding technology proposal by Microsoft," JCTVC-Q0035, 27 pp. (Mar. 2014).

Li et al., "Hash-based intraBC search," JCTVC-Q0252, 2 pp. (Mar. 2014).

Li et al., "Hash-based motion search," JCTVC-Q0245, 5 pp. (Mar. 2014).

Li et al., "Low complexity encoders for JCTVC-Q0035," JCTVC-Q0052, 4 pp. (Mar. 2014).

Praveen et al., "Analysis and Approximation of SAO Estimation for CTU-Level HEVC Encoder," *Proc. of Visual Communications and Image Processing*, 5 pp. (Nov. 2013).

Rane, "Hash-Aided Motion Estimation and Rate Control for Distributed Video Coding," EE392J Project Report, 10 pp. (Dec. 2004).

Robert et al., "Improving Intra mode coding in H.264/AVC through block oriented transforms," *IEEE 8th Workshop on Multimedia Signal Processing*, 5 pp. (Oct. 2006).

Sangi et al., "Global Motion Estimation Using Block Matching with Uncertainty Analysis," *Signal Processing Conference*, pp. 1823-1827 (Sep. 2007).

Shah et al., "HD Resolution Intra Prediction Architecture for H.264 Decoder," *IEEE Int'l Conf. on VLSI Design*, pp. 107-112 (Jan. 2012).

SMPTE Standard, "VC-1 Compressed Video Bitstream Format and Decoding Process," SMPTE 421M-2006, 493 pp. (Feb. 2006).

Sun et al., "Motion-Embedded Residual Error for Packet Loss Recovery of Video Transmission and Encryption," *Visual Communications and Image Processing*, vol. 6077, 14 pp. (Jan. 2006).

Wu et al., "Linear Hashtable Method Predicted Hexagonal Search Algorithm with Spatial Related Criterion," *Lecture Notes in Computer Science*, pp. 1208-1217 (Jun. 2005).

Yang et al., "MyFinder: Near-Duplicate Detection for Large Image Collections," *ACM Int'l Conf. on Multimedia*, pp. 1013-1014 (Oct. 2009).

Zhu et al., "2-D Dictionary Based Video Coding for Screen Contents," *Data Compression Conf.*, pp. 43-52 (Mar. 2014).

Zhu et al., "Screen content coding using 2-D dictionary mode," JCTVC-O0355, 4 pp. (Oct. 2013).

Zhu et al., "Screen content coding using 2-D dictionary mode," JCTVC-O0357, 4 pp. (Oct. 2013).

Chen et al., "Description of Screen Content Coding Technology Proposal by Qualcomm," JCTVC-Q0031, 18 pp. (Mar. 2014).

Chum et al., "Scalable Near Identical Image and Shot Detection", In Proceedings of International Conference on Image and Video Retrieval, Jul. 9, 2007, pp. 549-556.

Communication pursuant to Article 94(3) dated Jul. 6, 2017, from European Patent Application No. 14895767.3, 8 pp.

Gargi et al., "Performance Characterization of Video-Shot-Change Detection Methods", In IEEE Transactions on Circuits and Systems for Video Technology, vol. 10, Issue 1, Feb. 1, 2000, 13 Pages.

Li et al., "Adaptive Motion Vector Resolution for Screen Content," JCTVC-R0106 r1, ITU-T SG16 WP 3 and ISO/IEC JTC1/SC29/WG11, 18th Meeting, 16 pp. (Jun. 2014).

Li et al., "An HEVC-Based Screen Content Coding Scheme," JCTVC ITU-T SG16 WP3 and ISO/IEC JTC1/SC29/WG11 17th Meeting, 13 pp. (Mar. 27, 2014).

Li et al., "Screen Content Coding Using Dictionary Based Mode," JCTVC-P0214_r1, 5 pp. (Jan. 2014).

Monga et al, "Perceptual Image Hashing Via Feature Points: Performance Evaluation and Tradeoffs," IEEE Transactions Image Processing, pp. 3452-3465 (Nov. 2006).

Ribas-Corbera et al., "Optimizing Motion-Vector Accuracy in Block-Based Video Coding," *IEEE Trans. on Circuits and Systems for Video Technology*, vol. 11, No. 4, pp. 497-511 (Apr. 2001).

Supplementary European Search Report dated Jun. 14, 2017, from European Patent Application No. 14895767.3, 5 pp.

Tagliasacchi et al., "Hash-Based Motion Modeling in Wyner-Ziv Video Coding," *IEEE Int'l Conf on Acoustics, Speech, and Signal Processing*, 4 pp. (Apr. 2007).

Wei et al., "An Efficient Intra-Mode Selection Algorithm for H.264 Based on Edge Classification and Rate-Distortion Estimation," Signal Processing: Image Communication vol. 23, No. 9, pp. 699-710, Oct. 1, 2008 (retrieved Aug. 22, 2008).

Wikipedia, "Locality-sensitive Hashing" 7 pp. (document marked: "last edited on Feb. 6, 2018").

Yu et al., "New Intra Prediction Using Intra-Macroblock Motion Compensation," JVT-C151, 10 pp. (May 2002).

Zhou et al., "Motion Vector Resolution Control for Screen Content Coding," JCTVC-P0277, 6 pp. (Jan. 2014).

Brasnett et al., "Comments & Results on MPEG-7 Image Signature," MPEG2008/M15863, 4 pp. (Oct. 2008).

Communication pursuant to Article 94(3) EPC dated Aug. 25, 2016, from European Patent Application No. 13895864.0, 7 pp.

Communication pursuant to Article 94(3) EPC dated Feb. 8, 2017, from European Patent Application No. 14884278.4, 5 pp.

Communication pursuant to Article 94(3) dated Jun. 14, 2017, from European Patent Application No. 14885049.8, 7 pp.

Communication pursuant to Article 94(3) EPC dated Apr. 5, 2017, from European Patent Application No. 13895864.0, 4, pp.

Communication pursuant to Article 94(3) EPC dated Jan. 10, 2018, from European Patent Application No. 13895864.0, 4 pp.

Communication pursuant to Article 94(3) EPC dated Mar. 15, 2018, from European Patent Application No. 14895767.3, 5 pp.

Communication pursuant to Article 94(3) EPC dated Apr. 4, 2018, from European Patent Application No. 13896175.0, 6 pp.

Communication pursuant to Article 94(3) EPC dated May 24, 2018, from European Patent Application No. 13895864.0, 5 pp.

Communication pursuant to Rule 164(1) EPC dated Feb. 16, 2017, from European Patent Application No. 14885049.8, 7 pp.

Communication pursuant to Article 94(3) EPC dated Feb. 16, 2018, from European Patent Application No. 14903205.4, 11 pp.

Examination Report dated Sep. 29, 2016, from European Patent Application No. 13896175.0, 8 pp.

(56) References Cited

OTHER PUBLICATIONS

Final Office Action dated Apr. 6, 2018, from U.S. Appl. No. 15/024,812, 123 pp.
International Preliminary Report on Patentability dated May 6, 2016, from International Patent Application No. PCT/CN2013/085939, 6 pp.
International Preliminary Report on Patentability dated May 6, 2016, from International Patent Application No. PCT/CN2013/085937, 7 pp.
International Preliminary Report on Patentability dated Sep. 15, 2016, from International Patent Application No. PCT/CN2014/072834, 6 pp.
International Preliminary Report on Patentability dated Sep. 15, 2016, from International Patent Application No. PCT/CN2014/072827, 6 pp.
International Search Report and Written Opinion dated Jun. 10, 2014, from International Patent Application No. PCT/CN2013/085937, 12 pp.
International Search Report and Written Opinion dated Jul. 30, 2014, from International Patent Application No. PCT/CN2013/085939, 12 pp.
International Search Report and Written Opinion dated Dec. 10, 2014, from International Patent Application No. PCT/CN2014/072827, 12 pp.
International Search Report and Written Opinion dated Dec. 3, 2014, from International Patent Application No. PCT/CN2014/072834, 13 pp.
International Search Report and Written Opinion dated Jul. 1, 2015, from International Patent Application No. PCT/CN2014/087869, 12 pp.
International Search Report and Written Opinion dated May 3, 2018, from International Patent Application No. PCT/US2017/063164, 30 pp.
International Search Report and Written Opinion dated Jan. 24, 2018, from International Patent Application No. PCT/US2017/057066, 12 pp.
Invitation pursuant to Article 94(3) and Rule 71(1) EPC dated May 31, 2017, from European Patent Application No. 14884278.4, 3 pp.
Invitation pursuant to Article 94(3) and Rule 71(1) EPC dated Oct. 26, 2017, from European Patent Application No. 14885049.8, 5 pp.
Li et al., "A Unified Framework of Hash-based Matching for Screen Content Coding," *IEEE VCIP*, pp. 530-533 (Dec. 2014).
Li et al., "RDPCM operation unification and cleanup," JCTVC-00185, pp. 1-6 (Oct. 2013).
Notice on Grant of Patent dated Jun. 5, 2018, from Chinese Patent Application No. 201380080482.X, 4 pp.
Notice on the First Office Action dated Jun. 2, 2017, from Chinese Patent Application No. 201380080482.X, 13 pp.
Notice on the First Office Action dated Jan. 17, 2018, from Chinese Patent Application No. 201480030627.X, 14 pp.
Notice on the First Office Action dated Feb. 5, 2018, from Chinese Patent Application No. 201480029780.0, 14 pp.
Notice on the First Office Action dated Mar. 20, 2018, from Chinese Patent Application No. 201380080483.4, 12 pp.
Notice on the First Office Action dated May 3, 2018, from Chinese Patent Application No. 201480048046.9, 12 pp.
Notice on the Second Office Action dated Jan. 4, 2018, from Chinese Patent Application No. 201380080482.X, 7 pp.
Pauleve et al., "Locality Sensitive Hashing: A Comparison of Hash Function Types and Querying Mechanisms," *Pattern Recognition Letters*, vol. 31, No. 11, pp. 1348-1358 (Aug. 2010).
Rapaka et al., "Improved Intra Block Copy and Motion Search Methods for Screen Content Coding," *Visual Communications and Image Procsesing*, vol. 9599, pp. (Sep. 2015).
Riguer et al., "Real-Time Depth of Field Simulation," *ShaderX²: Shader Programming Tips and Tricks with DirectX 9*, pp. 1-30 (Jan. 2003).
Supplementary European Search Report dated Jul. 5, 2016, from European Patent Application No. 13895864.0, 4 pp.
Supplementary European Search Report dated Sep. 14, 2016, from European Patent Application No. 13896175.0, 6 pp.
Supplementary European Search Report dated Jan. 31, 2017, from European Patent Application No. 14884278.4, 4 pp.
Supplementary European Search Report dated May 18, 2017, from European Patent Application No. 14885049.8, 6 pp.
Supplementary Partial European Search Report dated Sep. 27, 2017, from European Patent Application No. 14903205.4, 14 pp.
Supplementary European Search Report dated Jan. 29, 2018, from European Patent Application No. 14903205.4, 9 pp.
Wikipedia, "Locality-sensitive Hashing" 6 pp. (document marked: "last modified on Apr. 18, 2013").
Communication under Rule 71(3) EPC dated Feb. 22, 2019, from European Patent Application No. 14895767.3, 5 pp.
Notice on the Third Office Action dated Mar. 13, 2019, from Chinese Patent Application No. 201480030627.X, 6 pp.
Office Action dated Sep. 28, 2017, from U.S. Appl. No. 15/024,816, 45 pp.
Office Action dated Oct. 2, 2017, from U.S. Appl. No. 15/024,816, 44 pp.
Office Action dated Oct. 13, 2017, from U.S. Appl. No. 15/321,536, 52 pp.
Office Action dated Mar. 12, 2019, from U.S. Appl. No. 15/029,589, 79 pp.
Extended European Search Report dated Aug. 21, 2018, from European Patent Application No. 18176302.0, 5 pp.
Final Office Action dated Apr. 9, 2018, from U.S. Appl. No. 15/321,536, 58 pp.
Final Office Action dated Nov. 21, 2018, from U.S. Appl. No. 15/029,589, 50 pp.
First Office Action and Search Report dated Jul. 19, 2018, from Chinese Patent Application No. 201480071892.2, 10 pp.
International Preliminary Report on Patentability dated Apr. 13, 2017, from International Patent Application No. PCT/CN2014/087869, 6 pp.
Li et al., "Improvement for hash based inter search," JCTVC-50089, 4 pp. (Oct. 2014).
Notice of Allowance dated Oct. 23, 2018, from U.S. Appl. No. 15/253,568, 8 pp.
Notice on the Second Office Action dated Sep. 29, 2018, from Chinese Patent Application No. 201480030627.X, 13 pp.
Notice on the Second Office Action dated Oct. 29, 2018, from Chinese Patent Application No. 201480029780.0, 11 pp.
Notice on Second Office Action dated Nov. 29, 2018, from Chinese Patent Application No. 201380080483.4, 6 pp.
Notice on the Second Office Action dated Jan. 23, 2019, from Chinese Patent Application No. 201480048046.9, 6 pp.
Office Action dated May 1, 2018, from U.S. Appl. No. 15/253,568, 7 pp.
Office Action dated Jul. 31, 2018, from U.S. Appl. No. 15/029,589, 45 pp.
Office Action dated Aug. 27, 2018, from U.S. Appl. No. 15/365,927, 22 pp.
Office action dated Jul. 12, 2018, from Russian Patent Application No. 2017110461, 7 pp.
Office action dated Jun. 26, 2018, from Japanese Patent Application No. 2017-517045, 7 pp.
Office Action dated Oct. 4, 2017, from U.S. Appl. No. 15/024,812, 75 pp.
Office Action dated Oct. 1, 2018, from U.S. Appl. No. 15/024,816, 59 pp.
Office Action dated Oct. 19, 2018, from U.S. Appl. No. 15/029,585, 49 pp.
Office Action dated Nov. 6, 2017, from U.S. Appl. No. 15/029,585, 51 pp.
Search Report dated Sep. 27, 2018, from European Patent Application No. 18176304.6, 8 pp.
Decision to Grant dated Nov. 14, 2019, from European Patent Application No. 13896175.0, 2 pp.
Extended European Search Report dated Nov. 28, 2019, from European Patent Application No. 19182387.7, 12 pp.
Final Office Action dated Oct. 4, 2019, from U.S. Appl. No. 15/508,067, 16 pp.

(56) References Cited

OTHER PUBLICATIONS

Notice of Allowance dated Oct. 9, 2019, from U.S. Appl. No. 15/029,589, 14 pp.
Office Action dated Sep. 17, 2019, from Mexican Patent Application No. MX/a/2017/004210, 5 pp.
Communication under Rule 71(3) EPc dated Jul. 12, 2019, from European Patent Application No. 13896175.0, 7 pp.
Decision to Grant dated Jul. 4, 2019, from European Patent Application No. 14895767.3, 2 pp.
Examination Report No. 1 dated Mar. 14, 2019, from Australian Patent Application No. 2014408223, 4 pp.
Examination Report No. 2 dated Jun. 3, 2019, from Australian Patent Application No. 2014408223, 3 pp.
Final Office Action dated Apr. 16, 2019, from U.S. Appl. No. 15/024,816, 73 pp.
Notice on Grant of Patent dated Apr. 4, 2019, from Chinese Patent Application No. 201480048046.9, 4 pp.
Notice on Grant of Patent dated Apr. 18, 2019, from Chinese Patent Application No. 201480029780.0, 4 pp.
Notice on Grant of Patent dated May 14, 2019, from Chinese Patent Application No. 201380080483.4, 4 pp.
Notice on Grant of Patent dated May 29, 2019, from Chinese Patent Application No. 201480030627.X, 4 pp.
Office Action dated Jun. 28, 2019, from U.S. Appl. No. 15/508,067, 18 pp.

* cited by examiner software 180 implementing one or more innovations for encoder decision-making based on results of hash-based block matching

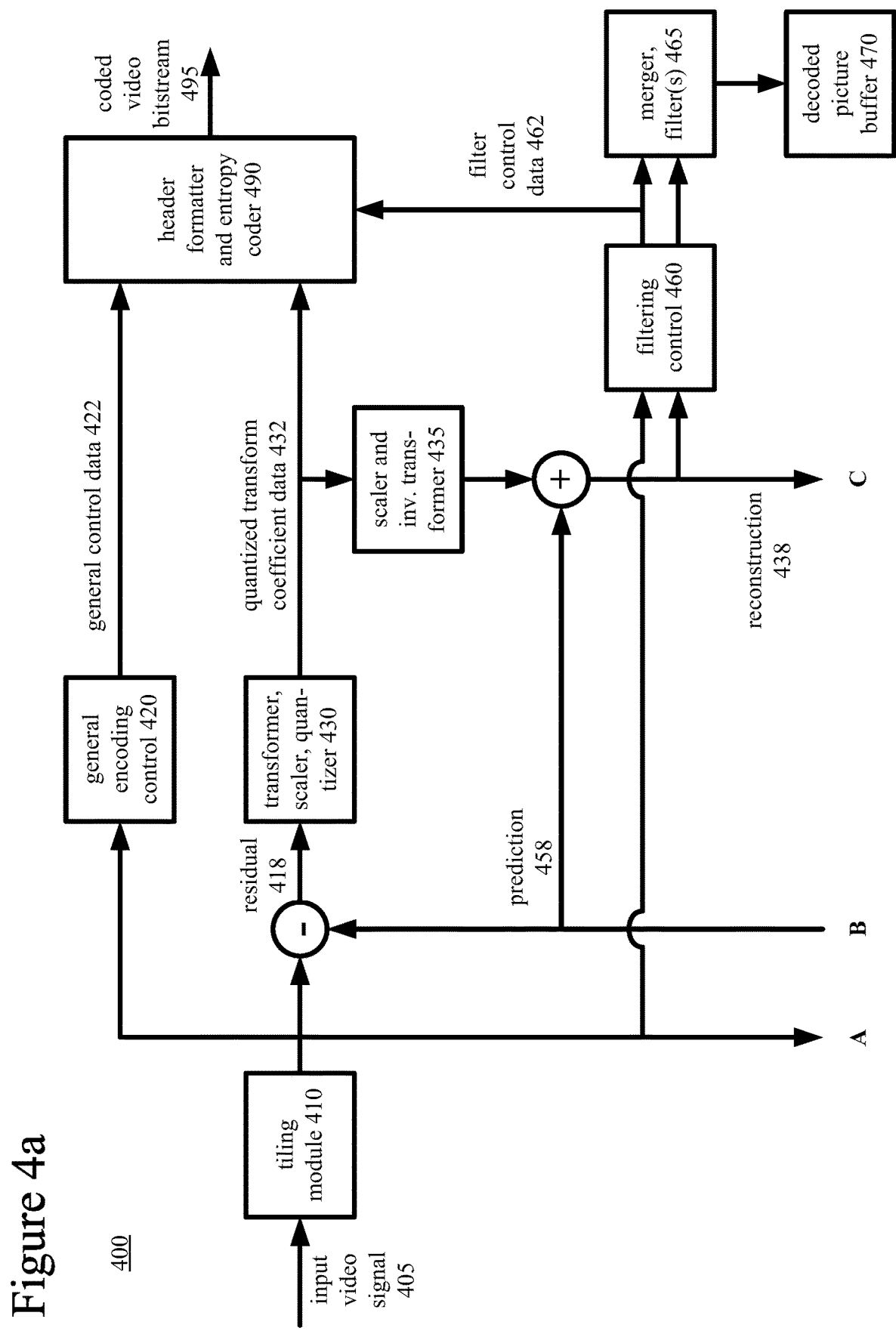

400 computer desktop environment (510) with content that
may provide input for screen capture composite video (620) with natural video
content and palette-based content Figure 7  700  $h(B_{current}) = h_3$ $h_0$: $B(1266, 263), B(1357, 365), B(1429, 401), B(502, 464), \ldots$ $h_1$: $B(1704, 154), B(1709, 177), B(1158, 242)$ $h_2$: $B(1321, 49), B(145, 182), B(599, 490), B(1668, 511), \ldots$ $h_3$: $B(569, 73), B(1293, 102), B(401, 290), B(455, 306), \ldots$ $h_4$: $B(1119, 46)$ $h_5$: $B(1381, 11), B(1676, 53), B(38, 119), B(1633, 184), \ldots$ $h_6$: $B(979, 85), B(1013, 177), B(575, 470), B(900, 477), \ldots$

.
.
.

$h_{n-1}$: $B(794, 14), B(1479, 17), B(19, 317), B(1338, 374), \ldots$

Figure 8a   800

$h_0$ :   entry(0, 0), entry(0, 1), entry(0, 2), entry(0, 3), . . .

$h_1$ :   entry(1, 0), entry(1, 1), entry(1, 2), entry(1, 3), . . .

$h_2$ :

$h_3$ :   entry(3, 0), entry(3, 1), entry(3, 2), entry(3, 3)

$h_4$ :   entry(4, 0), entry(4, 1), entry(4, 2), entry(4, 3), . . .

$h_5$ :   entry(5, 0), entry(5, 1), entry(5, 2), entry(5, 3), . . .

$h_6$ :   entry(6, 0), entry(6, 1)

. . .

$h_{n-1}$ :   entry(n-1, 0), entry(n-1, 1), entry(n-1, 2), entry(n-1, 3), . . .

Figure 8b   810

*entry($h_i$, k)* :   address of *B*

Figure 8c   820

*entry($h_i$, k)* :   address of *B* and hash value $h'(B)$ from $2^{nd}$ hash function $h'()$

Figure 9a  900  $h(B_{current}) = h_2$ $h_0$:    $h'_0$ list, $h'_1$ list, $h'_2$ list, $h'_3$ list, ...

$h_1$:    $h'_0$ list, $h'_1$ list, $h'_2$ list, $h'_3$ list, ...

$\boxed{h_2: \quad h'_0 \text{ list}, h'_1 \text{ list}, h'_2 \text{ list}, h'_3 \text{ list}, \ldots}$ $h_3$:    $h'_0$ list, $h'_1$ list, $h'_2$ list, $h'_3$ list, ...

.
.
.

$h_{n1-1}$:    $h'_0$ list, $h'_1$ list, $h'_2$ list, $h'_3$ list, ...

Figure 9b  910  $h'(B_{current}) = h'_0$ $\boxed{h'_0: \quad entry(0, 0), entry(0, 1), entry(0, 2), entry(0, 3), \ldots}$ $h'_1$:    $entry(1, 0), entry(1, 1), entry(1, 2), entry(1, 3), \ldots$ $h'_2$:

$h'_3$:    $entry(3, 0), entry(3, 1), entry(3, 2), entry(3, 3)$

.
.
.

$h'_{n2-1}$:    $entry(n2-1, 0), entry(n2-1, 1), entry(n2-1, 2), \ldots$

Figure 9c  920

$entry(h'_i, k)$:    address of $B$

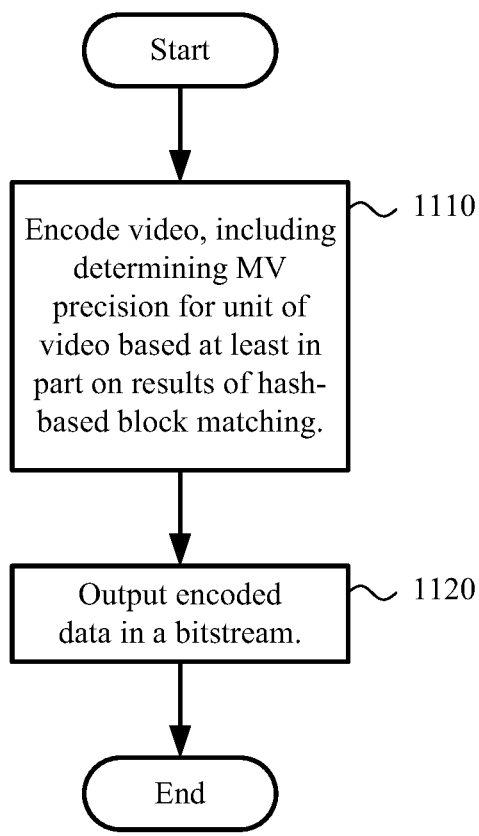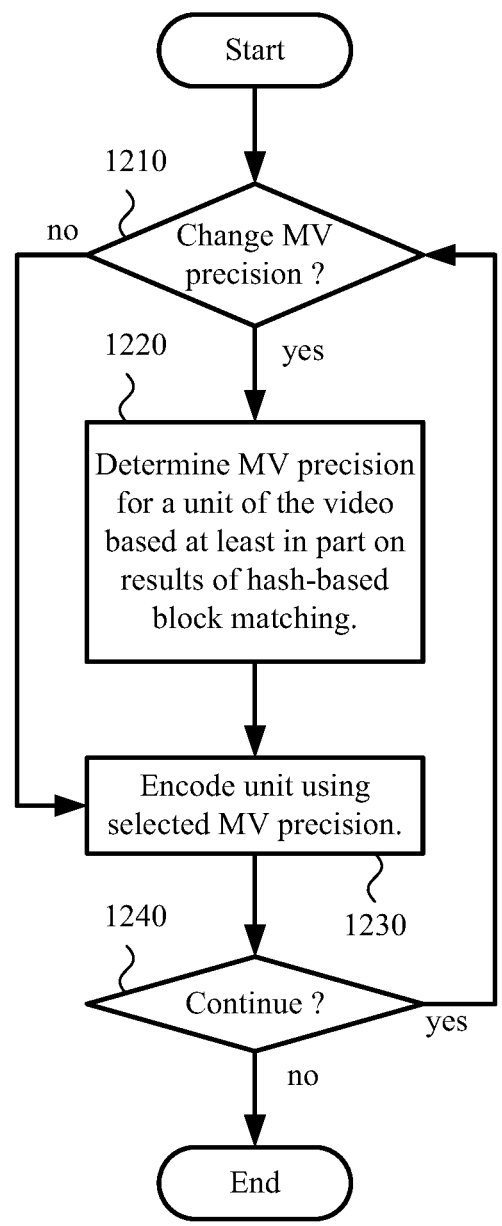

Figure 13
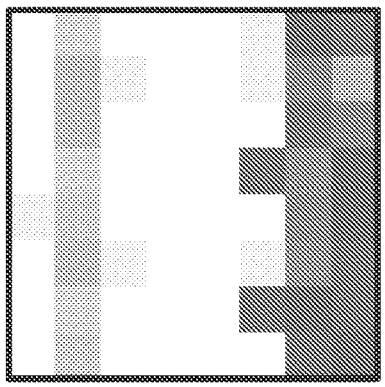
block 1310 of natural video content
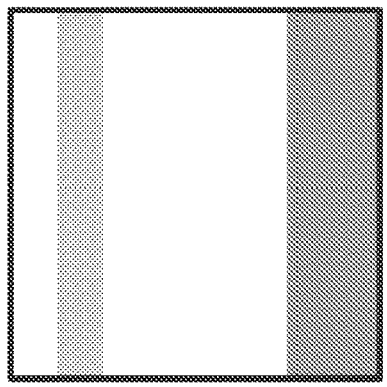
block 1320 of screen capture content
Figure 14
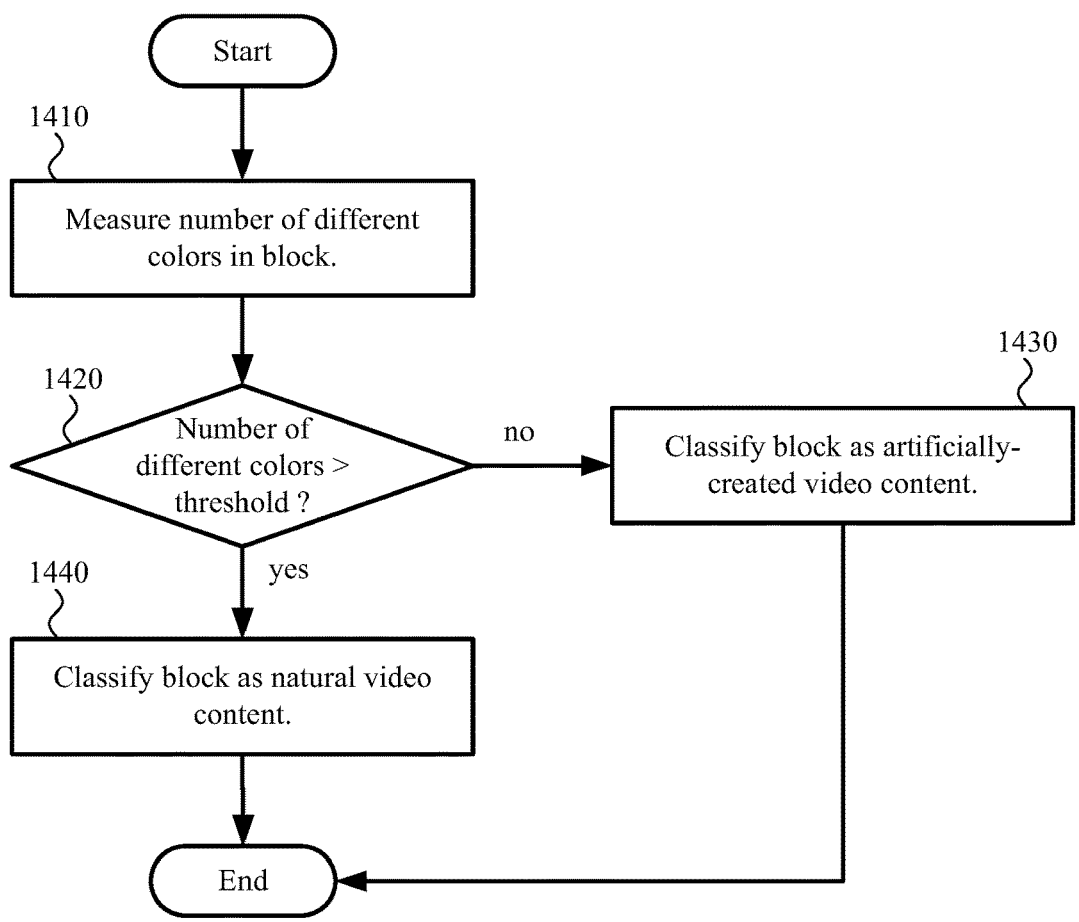

Figure 18
1800
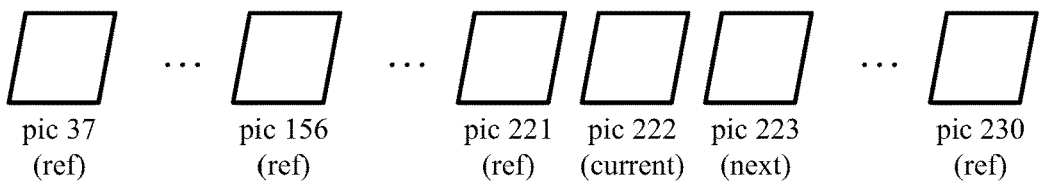
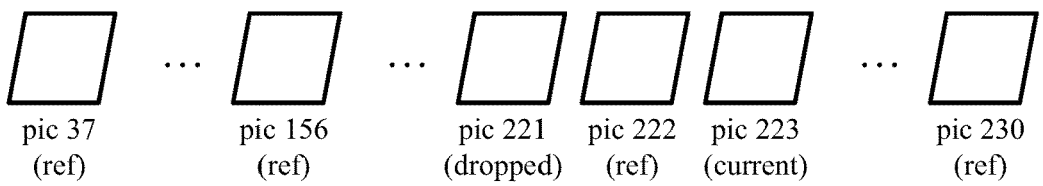
| picture being decoded (current) | reference picture set (RPS) |
|---|---|
| pic 222 | pic 37, pic 156, pic 221, pic 230 |
| pic 223 | pic 37, pic 156, pic 222, pic 230 |
Figure 19
1900
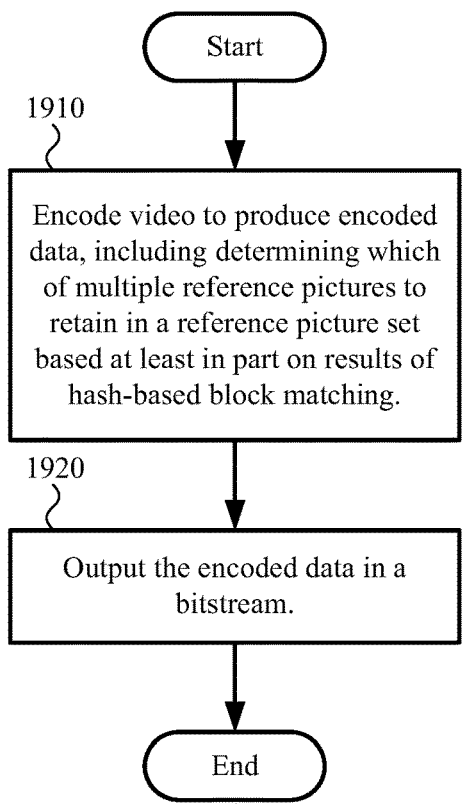

ENCODER DECISIONS BASED ON RESULTS OF HASH-BASED BLOCK MATCHING

CROSS REFERENCE TO RELATED APPLICATIONS

This application is the U.S. National Stage of International Application No. PCT/CN2014/080481, filed Jun. 23, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of sample values in a current picture with a candidate block of the same size in a search area in another picture, the reference picture. A reference picture is, in general, a picture that contains sample values that may be used for prediction in the decoding process of other pictures.

For a current block, when the encoder finds an exact or "close enough" match in the search area in the reference picture, the encoder parameterizes the change in position between the current and candidate blocks as motion data such as a motion vector ("MV"). An MV is conventionally a two-dimensional value, having a horizontal MV component that indicates left or right spatial displacement and a vertical MV component that indicates up or down spatial displacement. In general, motion compensation is a process of reconstructing pictures from reference picture(s) using motion data.

I. MV Precision.

An MV can indicate a spatial displacement in terms of an integer number of samples starting from a co-located position in a reference picture for a current block. For example, for a current block at position (32, 16) in a current picture, the MV (−3, 1) indicates position (29, 17) in the reference picture. Or, an MV can indicate a spatial displacement in terms of a fractional number of samples from a co-located position in a reference picture for a current block. For example, for a current block at position (32, 16) in a current picture, the MV (−3.5, 1.25) indicates position (28.5, 17.25) in the reference picture. To determine sample values at fractional offsets in the reference picture, the encoder typically interpolates between sample values at integer-sample positions. Such interpolation can be computationally intensive. During motion compensation, a decoder also performs the interpolation as needed to compute sample values at fractional offsets in reference pictures.

When encoding a block using motion estimation and motion compensation, an encoder often computes the sample-by-sample differences (also called residual values or error values) between the sample values of the block and its motion-compensated prediction. The residual values may then be encoded. For the residual values, encoding efficiency depends on the complexity of the residual values and how much loss or distortion is introduced as part of the compression process. In general, a good motion-compensated prediction closely approximates a block, such that the residual values include few significant values, and the residual values can be efficiently encoded. On the other hand, a poor motion-compensated prediction often yields residual values that include many significant values, which are more difficult to encode efficiently. Encoders typically spend a large proportion of encoding time performing motion estimation, attempting to find good matches and thereby improve rate-distortion performance.

Different video codec standards and formats have used MVs with different MV precisions. For integer-sample MV precision, an MV component indicates an integer number of sample values for spatial displacement. For a fractional-sample MV precision such as ½-sample MV precision or ¼-sample MV precision, an MV component can indicate an integer number of sample values or fractional number of sample values for spatial displacement. For example, if the MV precision is ¼-sample MV precision, an MV component can indicate a spatial displacement of 0 samples, 0.25 samples, 0.5 samples, 0.75 samples, 1.0 samples, 1.25 samples, and so on. When a codec uses MVs with integer-sample MV precision, an encoder and decoder need not perform interpolation operations between sample values of reference pictures for motion compensation. When a codec uses MVs with fractional-sample MV precision, an encoder and decoder perform interpolation operations between sample values of reference pictures for motion compensation (adding computational complexity), but motion-compensated predictions tend to more closely approximate blocks (leading to residual values with fewer significant values), compared to integer-sample MV precision.

Some video codec standards and formats support switching of MV precision during encoding. Encoder-side decisions about which MV precision to use are not made effectively, however, in certain encoding scenarios. In particular, such encoder-side decisions are not made effectively in various situations when encoding artificially-created video content such as screen capture content.

II. Reference Picture Sets.

In some video codec standards and formats, multiple reference pictures are available at a given time for use for motion-compensated prediction. Such video codec standards/formats specify how to manage the multiple reference pictures. For example, reference pictures can be added or dropped automatically according to rules during video encoding and decoding. Or, parameters in a bitstream may indicate information about reference pictures used during video encoding and decoding.

In some video codec standards and formats, a reference picture set ("RPS") is a set of reference pictures available for use in motion-compensated prediction at a given time. During encoding and decoding, an RPS can be updated to add newly decoded pictures and remove older pictures that are no longer used as reference pictures. In some recent codec standards (such as the H.265/HEVC standard), an RPS is updated during encoding and decoding, and syntax elements signaled in the bitstream indicate how to update the RPS.

Encoder-side decisions about how to update an RPS are not made effectively in certain encoding scenarios, however. In particular, such decisions are not made effectively in various situations when encoding artificially-created video content such as screen capture content.

III. Sample Adaptive Offset Filtering.

A video encoder or video decoder can apply one or more filters to reconstructed sample values of pictures. According to the H.265/HEVC standard, for example, deblock filtering and sample adaptive offset ("SAO") filtering can be applied to reconstructed sample values. Deblock filtering tends to reduce blocking artifacts due to block-based coding, and is adaptively applied to sample values at block boundaries. Within a region, SAO filtering is adaptively applied to sample values that satisfy certain conditions, such as presence of a gradient across the sample values.

According to the H.265/HEVC standard, SAO filtering can be enabled or disabled for a sequence. When enabled for a sequence, SAO filtering can be enabled or disabled on a slice-by-slice basis for luma content of a slice and/or for chroma content of the slice. SAO filtering can also be enabled or disabled for blocks within a slice. For example, SAO filtering can be enabled or disabled for coding tree blocks ("CTBs") of a coding tree unit ("CTU") in a slice, where a CTU typically includes a luma CTB and corresponding chroma CTBs. For a CTB, a type index indicates whether SAO filtering is disabled, uses band offsets, or uses edge offsets. If SAO filtering uses band offsets or edge offsets, additional syntax elements indicate parameters for the SAO filtering for the CTB. In some cases, a CTB can reuse syntax elements from an adjacent CTB to control SAO filtering. In any event, when SAO filtering is used, it increases the computational complexity of encoding and decoding.

There are many conditions and situations in which SAO filtering should be disabled. Encoder-side decisions about when to use SAO filtering are not made effectively, however, in certain encoding scenarios. In particular, such decisions are not made effectively in various situations when encoding artificially-created video content such as screen capture content.

SUMMARY

In summary, the detailed description presents innovations in encoder-side decisions that use the results of hash-based block matching when setting parameters during encoding. For example, some of the innovations relate to ways to select motion vector ("MV") precision depending on the results of hash-based block matching. Other innovations relate to ways to selectively disable sample adaptive offset ("SAO") filtering depending on the results of hash-based block matching. Still other innovations relate to ways to select which reference pictures to retain in a reference picture set ("RPS") depending on the results of hash-based block matching. In particular, the innovations can provide computationally-efficient ways to set parameters during encoding of artificially-created video content such as screen capture content.

According to a first aspect of the innovations described herein, a video encoder encodes video to produce encoded data and outputs the encoded data in a bitstream. As part of the encoding, the encoder determines an MV precision for a unit of the video based at least in part on the results of hash-based block matching. The unit can be a sequence, series of pictures between scene changes, group of pictures, picture, tile, slice, coding unit or other unit of video. The MV precision can be integer-sample precision, quarter-sample precision, or some other fractional-sample precision.

For example, when determining the MV precision, the encoder splits the unit into multiple blocks. For a given block of the multiple blocks of the unit, the encoder determines a hash value for the given block, then determines whether there is a match for it among multiple candidate blocks of reference picture(s). The match can signify matching hash values between the given block and one of the multiple candidate blocks, which provides a fast result. Or, the match can further signify sample-by-sample matching between the given block and the one of the multiple candidate blocks, which is slower but may be more reliable. Then, for a non-matched block among the multiple blocks of the unit, the encoder can classify the non-matched block as containing natural video content or artificially-created video content. For example, when classifying the non-matched block, the encoder measures a number of different colors in the non-matched block, then compares the number of different colors to a threshold.

According to another aspect of the innovations described herein, an image encoder or video encoder encodes an image or video to produce encoded data, and outputs the encoded data in a bitstream. As part of the encoding, the encoder performs hash-based block matching for a current block of a current picture. Based on whether a condition is satisfied, the encoder determines whether to disable SAO filtering for the current block. Based on results of the determining, the encoder selectively disables SAO filtering for the current block. If SAO filtering is not disabled for the current block, the encoder can check one or more other conditions to decide whether to use SAO filtering for the current block and, if SAO filtering is used, determine parameters for SAO filtering for the current block.

The condition (for whether to enable or disable SAO filtering for the current block) depends on whether a match is found during the hash-based block matching for the current block. The condition can also depend on expected quality of the current block relative to quality of a candidate block for the match (e.g., as indicated by a quantization parameter ("QP") value that applies for the current block and a QP value that applies for the candidate block, respectively).

For example, when performing the hash-based block matching for the current block, the encoder determines a hash value for the current block, then attempts to find the match for it among multiple candidate blocks of reference picture(s). The current block can be a coding tree block ("CTB") of a coding tree unit ("CTU"), in which case SAO filtering is also selectively disabled for one or more other CTBs of the CTU.

According to another aspect of the innovations described herein, a video encoder encodes video to produce encoded data and outputs the encoded data in a bitstream. As part of the encoding, the encoder determines which of multiple reference pictures to retain in an RPS based at least in part on results of hash-based block matching.

In one approach to determining which reference pictures to retain, for each of the multiple reference pictures, the encoder uses the hash-based block matching to estimate how well the reference picture predicts a next picture of a sequence. The encoder drops the reference picture that is expected to predict the next picture worse than the other reference pictures predict the next picture. For example, the encoder performs the hash-based block matching between blocks of the next picture and candidate blocks of a reference picture, where a count indicates how many of the blocks of the next picture have matching blocks in the reference picture. With this information, the encoder drops the reference picture having the lowest count.

The multiple reference pictures can include one or more previous reference pictures previously in the RPS for encoding of a current picture. In this case, the multiple reference pictures can also include a current reference picture that is a reconstructed version of the current picture.

In another approach to determining which reference pictures to retain, for each of the previous reference picture(s) in the RPS, the encoder uses the hash-based block matching to estimate similarity to the current reference picture. The encoder drops one of the previous reference picture(s) that is estimated to be most similar to the current reference picture. For example, the encoder performs the hash-based block matching between blocks of the current reference picture and candidate blocks of a previous reference picture, where a count indicates how many of the blocks of the current reference picture have matching blocks in the previous reference picture. With this information, the encoder drops the previous reference picture having the highest count.

The innovations for encoder-side decisions can be implemented as part of a method, as part of a computing device adapted to perform the method or as part of a tangible computer-readable media storing computer-executable instructions for causing a computing device to perform the method. The various innovations can be used in combination or separately. For example, any of the innovations for selecting MV precision can be used separately or in combination with any of the innovations for selectively disabling SAO filtering and/or any of the innovations for deciding which reference pictures to retain in an RPS. As another example, any of the innovations for selectively disabling SAO filtering can be used separately or in combination with any of the innovations for selecting MV precision and/or any of the innovations for deciding which reference pictures to retain in an RPS. As another example, any of the innovations for deciding which reference pictures to retain in an RPS can be used separately or in combination with any of the innovations for selectively disabling SAO filtering and/or any of the innovations for selecting MV precision.

The foregoing and other objects, features, and advantages of the invention will become more apparent from the following detailed description, which proceeds with reference to the accompanying figures.

BRIEF DESCRIPTION OF THE DRAWINGS

FIGS. 4a and 4b are diagrams illustrating an example video encoder in conjunction with which some described embodiments can be implemented.

FIG. 7 is a table illustrating hash values for candidate blocks in hash-based block matching.

FIGS. 8a-8c are tables illustrating example data structures that organize candidate blocks for hash-based block matching.

FIGS. 9a-9c are tables illustrating example data structures that organize candidate blocks for iterative hash-based block matching.

FIGS. 11, 12 and 15 are flowcharts illustrating techniques for selecting MV precision depending on the results of hash-based block matching.

FIG. 13 is a diagram illustrating characteristics of blocks of natural video content and blocks of screen capture content.

FIG. 14 is a flowchart illustrating a generalized technique for classifying a block of video depending on a measure of the number of different colors in the block.

FIG. 18 is a diagram illustrating updates to reference pictures of an RPS.

FIGS. 19-21 are flowcharts illustrating techniques for deciding which reference pictures to retain in an RPS depending on the results on hash-based block matching.

DETAILED DESCRIPTION

Figure 1:
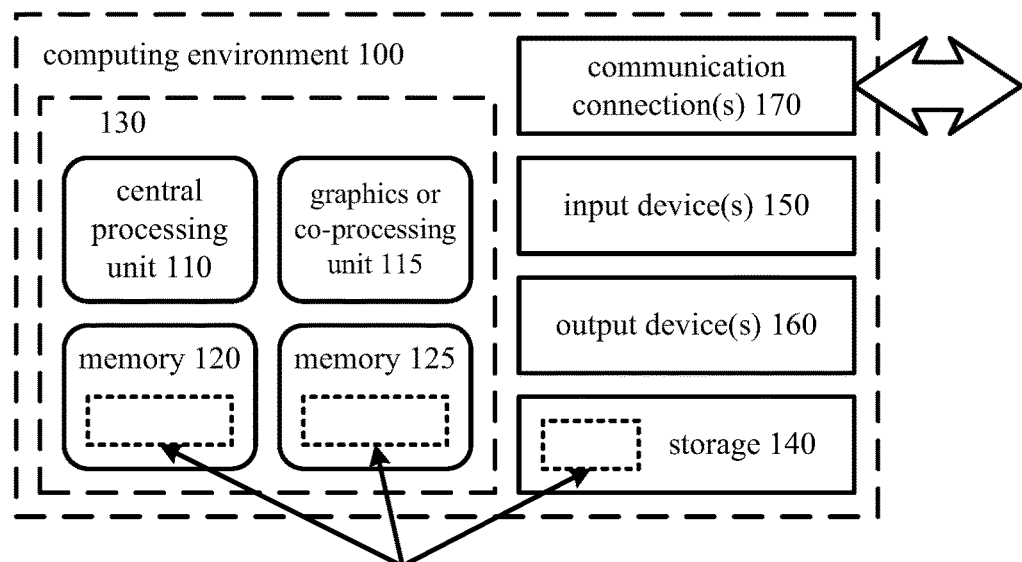
FIG. 1 is a diagram of an example computing system in which some described embodiments can be implemented.

The detailed description presents innovations in encoder-side decisions that use the results of hash-based block matching when setting parameters during encoding. For example, some of the innovations relate to ways to select motion vector ("MV") precision depending on the results of hash-based block matching. Other innovations relate to ways to selectively disable sample adaptive offset ("SAO") filtering depending on the results of hash-based block matching. Still other innovations relate to ways to select which reference pictures to retain in a reference picture set ("RPS") depending on the results of hash-based block matching. In particular, the innovations can provide computationally-efficient ways to set parameters during encoding of artificially-created video content such as screen capture content.

Although operations described herein are in places described as being performed by a video encoder, in many cases the operations can be performed by another type of media processing tool (e.g., image encoder).

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

Many of the innovations described herein can improve decision-making processes when encoding certain artificially-created video content such as screen capture content from a screen capture module. Screen capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen capture content include remote desktop conferencing and encoding/decoding of graphical overlays on natural video or other "mixed-content" video. Several of the innovations described herein (e.g., selecting MV precision, selectively disabling SAO filtering, determining which references pictures to retain in an RPS) are adapted for encoding of artificially-created video content, or for encoding of mixed-content video that includes at least some artificially-created video content. These innovations can also be used for natural video content, but may not be as effective.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder decisions based on the results of hash-based block matching (e.g., for selecting MV precision, for selectively disabling SAO filtering and/or for deciding which references pictures to retain in a RPS), in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoder decisions based on the results of hash-based block matching.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
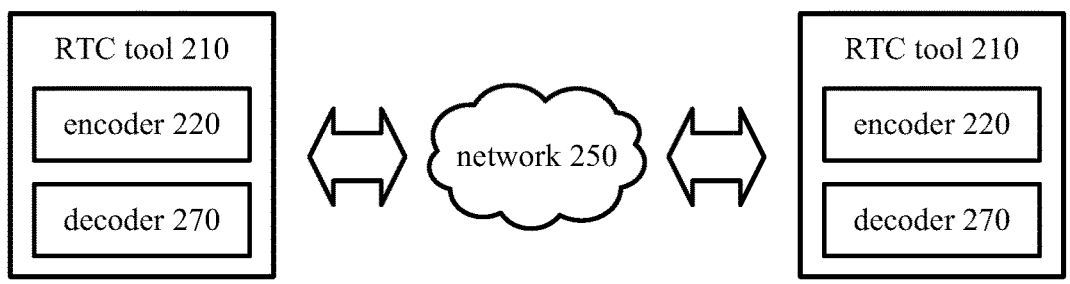
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2a includes two real-time communication tools (210), the network environment (201) can instead include three or more real-time communication tools (210) that participate in multi-party communication.

Figure 3:
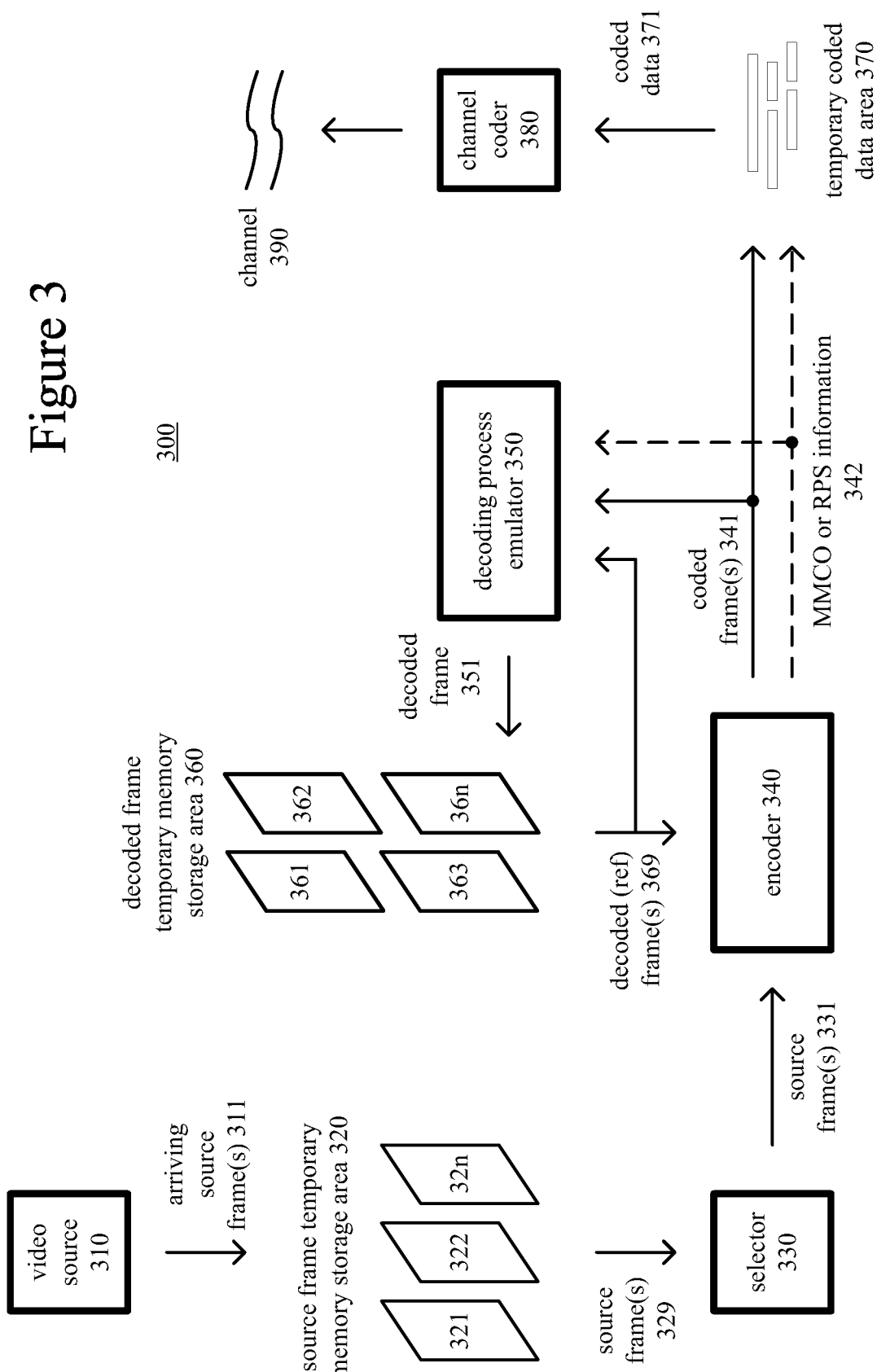
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using encoder-side decisions as described herein.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format, GBR 4:4:4 format or BGR 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area. Example ways to make decisions about which reference pictures to retain in an RPS are described below.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra block copy ("BC") prediction, an intra-picture estimator or motion estimator estimates displacement of a block with respect to the other, previously reconstructed sample values in the same frame. An intra-frame prediction reference region is a region of sample values in the frame that are used to generate BC-prediction values for the block. The intra-frame prediction region can be indicated with a block vector ("BV") value, which can be represented in the bitstream as a motion vector ("MV") value. For intra spatial prediction for a block, the intra-picture estimator estimates extrapolation of the neighboring reconstructed sample values into the block. Prediction information (such as BV/MV values for intra BC prediction, or prediction mode (direction) for intra spatial prediction) can be entropy coded and output. An intra-frame prediction predictor (or motion compensator for BV/MV values) applies the prediction information to determine intra prediction values.

The encoder (340) represents an inter-frame coded, predicted block of a source frame (331) in terms of prediction from one or more reference frames (369). A motion estimator estimates the motion of the block with respect to the one or more reference frames (369). The motion estimator can select an MV precision (e.g., integer-sample MV precision, ½-sample MV precision, or ¼-sample MV precision), for example, using an approach described herein, then use the selected MV precision during motion estimation. When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as MV information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, selected MV precision, SAO filtering parameters, RPS update information, QP values, mode decisions, other parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or SAO filtering) can alternatively or additionally be applied as in-loop filtering operations. Example approaches to making decisions about enabling or disabling SAO filtering are described below.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Video Encoders

Figure 4B:
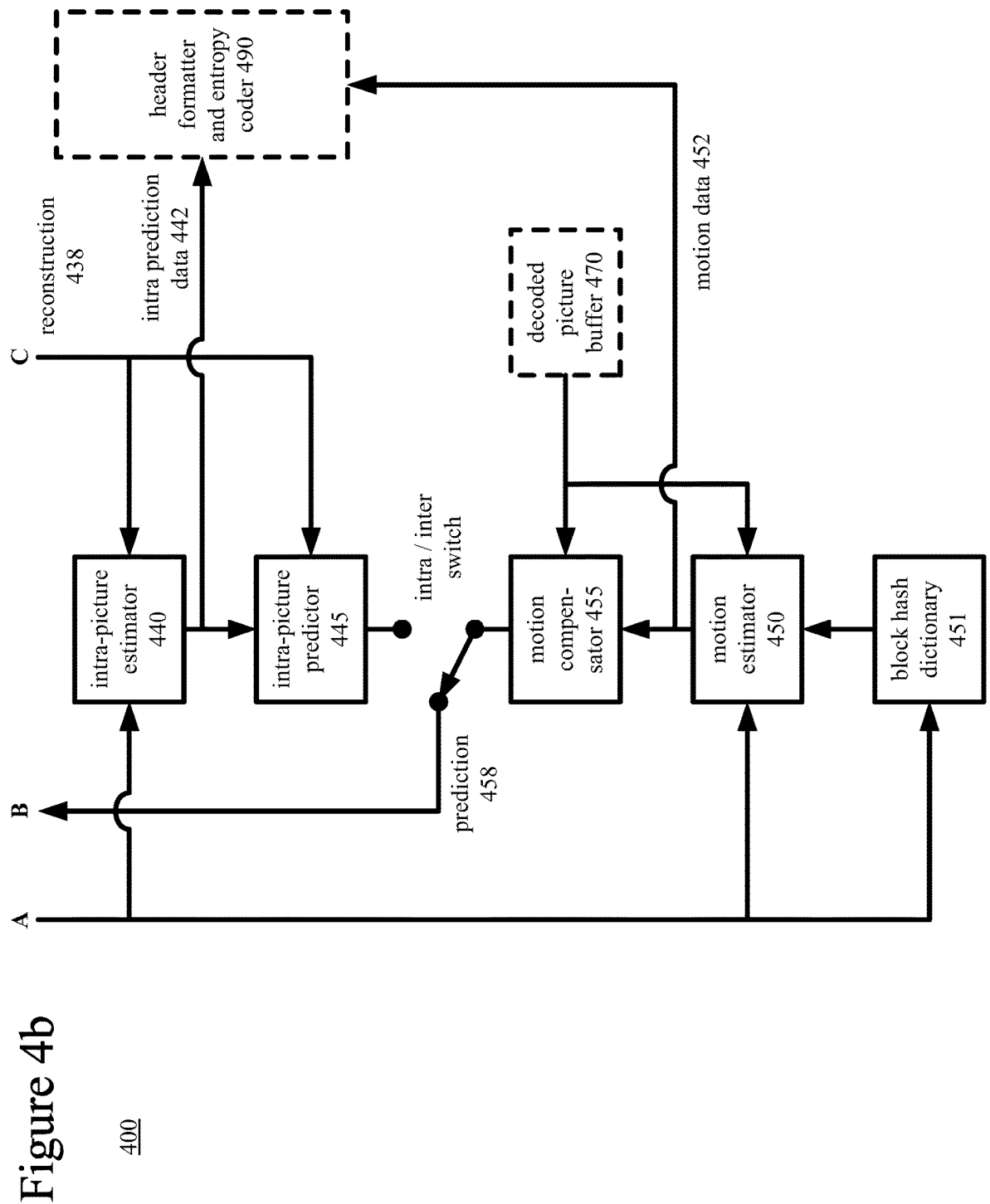

FIGS. 4a and 4b are a block diagram of a generalized video encoder (400) in conjunction with which some described embodiments may be implemented. The encoder (400) receives a sequence of video pictures including a current picture as an input video signal (405) and produces encoded data in a coded video bitstream (495) as output.

The encoder (400) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (400) compresses pictures using intra-picture coding and/or inter-picture coding. Many of the components of the encoder (400) are used for both intra-picture coding and inter-picture coding. The exact operations performed by those components can vary depending on the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. In H.265/HEVC implementations, the encoder (400) partitions a picture into one or more slices, where each slice includes one or more slice segments.

The general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), motion estimator (450), filtering control (460) and intra/inter switch) to set and change coding parameters during encoding. For example, during encoding the general encoding control (420) can manage decisions about MV precision, whether to enable or disable SAO filtering and which reference pictures to retain in an RPS. The general encoding control (420) can also evaluate intermediate results during encoding, for example, performing rate-distortion analysis. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to one or more reference pictures. The decoded picture buffer ("DPB") (470) buffers one or more reconstructed previously coded pictures for use as reference pictures. When multiple reference pictures are used, the multiple reference pictures can be from different temporal directions or the same temporal direction.

Working with the general encoding control (420) and a block hash dictionary (451), the motion estimator (450) can select an MV precision (e.g., integer-sample MV precision, ½-sample MV precision, or ¼-sample MV precision) using an approach described herein, then use the selected MV precision during motion estimation. For hash-based block matching during the motion estimation, the motion estimator (450) can use the block hash dictionary (451) to find an MV value for a current block. The block hash dictionary (451) is a data structure that organizes candidate blocks for hash-based block matching. The block hash dictionary (451) is an example of a hash table. In FIG. 4b, the block hash dictionary (451) is constructed based upon input sample values. Alternatively, a block hash dictionary can be constructed based upon reconstructed sample values and updated during encoding to store information about new candidate blocks, as those candidate blocks become available for use in hash-based block matching.

The motion estimator (450) produces as side information motion data (452) such as MV data, merge mode index values, and reference picture selection data, and the selected MV precision. These are provided to the header formatter/entropy coder (490) as well as the motion compensator (455).

The motion compensator (455) applies MVs to the reconstructed reference picture(s) from the DPB (470). The motion compensator (455) produces motion-compensated predictions for the current picture.

In a separate path within the encoder (400), an intra-picture estimator (440) determines how to perform intra-picture prediction for blocks of sample values of a current picture of the input video signal (405). The current picture can be entirely or partially coded using intra-picture coding. Using values of a reconstruction (438) of the current picture, for intra spatial prediction, the intra-picture estimator (440) determines how to spatially predict sample values of a current block of the current picture from neighboring, previously reconstructed sample values of the current picture. The intra-picture estimator (440) can determine the direction of spatial prediction to use for a current block.

Or, for intra BC prediction using BV/MV values, the intra-picture estimator (440) or motion estimator (450) estimates displacement of the sample values of the current block to different candidate reference regions within the current picture, as a reference picture. For hash-based block matching, the intra-picture estimator (440) or motion estimator (450) can use a block hash dictionary (not shown) to find a BV/MV value for a current block. Or, for an intra-picture dictionary coding mode, pixels of a block are encoded using previous sample values stored in a dictionary or other location, where a pixel is a set of co-located sample values (e.g., an RGB triplet or YUV triplet).

The intra-picture estimator (440) produces as side information intra prediction data (442), such as mode information, prediction mode direction (for intra spatial prediction), and offsets and lengths (for dictionary mode). The intra prediction data (442) is provided to the header formatter/entropy coder (490) as well as the intra-picture predictor (445).

According to the intra prediction data (442), the intra-picture predictor (445) spatially predicts sample values of a current block of the current picture from neighboring, previously reconstructed sample values of the current picture. Or, for intra BC prediction, the intra-picture predictor (445) or motion compensator (455) predicts the sample values of the current block using previously reconstructed sample values of an intra-picture prediction reference region, which is indicated by a BV/MV value for the current block. Or, for intra-picture dictionary mode, the intra-picture predictor (445) reconstructs pixels using offsets and lengths.

The intra/inter switch selects whether the prediction (458) for a given block will be a motion-compensated prediction or intra-picture prediction.

The difference (if any) between a block of the prediction (458) and a corresponding part of the original current picture of the input video signal (405) provides values of the residual (418), for a non-skip-mode block. During reconstruction of the current picture, for a non-skip-mode block, reconstructed residual values are combined with the prediction (458) to produce an approximate or exact reconstruction (438) of the original content from the video signal (405). (In lossy compression, some information is lost from the video signal (405).)

In the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. The transformer/scaler/quantizer (430) can apply a transform with variable block sizes. The encoder (400) can also skip the transform step in some cases.

The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (432) is provided to the header formatter/entropy coder (490).

In the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. For a non-skip-mode block, the encoder (400) combines reconstructed residual values with values of the prediction (458) (e.g., motion-compensated prediction values, intra-picture prediction values) to form the reconstruction (438). For a skip-mode block or dictionary-mode block, the encoder (400) uses the values of the prediction (458) as the reconstruction (438).

For spatial intra-picture prediction, the values of the reconstruction (438) can be fed back to the intra-picture estimator (440) and intra-picture predictor (445). For intra BC prediction, the values of the reconstruction (438) can similarly be fed back to provide reconstructed sample values. Also, the values of the reconstruction (438) can be used for motion-compensated prediction of subsequent pictures.

The values of the reconstruction (438) can be further filtered. A filtering control (460) determines how to perform deblock filtering and SAO filtering on values of the reconstruction (438), for a given picture of the video signal (405). With the general encoding control (420) and the block hash dictionary (451), the filtering control (460) can make decisions about enabling or disabling SAO filtering, as explained below. The filtering control (460) produces filter control data (462), which is provided to the header formatter/entropy coder (490) and merger/filter(s) (465).

In the merger/filter(s) (465), the encoder (400) merges content from different tiles into a reconstructed version of the picture. The encoder (400) selectively performs deblock filtering and/or SAO filtering according to the filter control data (462). Other filtering (such as de-ringing filtering or ALF) can alternatively or additionally be applied. Tile boundaries can be selectively filtered or not filtered at all, depending on settings of the encoder (400), and the encoder (400) may provide syntax within the coded bitstream to indicate whether or not such filtering was applied.

The DPB (470) buffers the reconstructed current picture for use in subsequent motion-compensated prediction. In particular, references pictures in the RPS can be buffered in the DPB (470). The DPB (470) has limited memory space, however. If the reconstructed current picture is retained in the DPB (470) for use as a reference picture, another picture may be removed from the DPB (470) (and dropped from the RPS). The general encoding control (420) decides which pictures to retain in the RPS and buffer in the DPB (470). Using the block hash dictionary (451), the general encoding control (420) can make decisions about which reference pictures to retain in the RPS, as explained below.

The header formatter/entropy coder (490) formats and/or entropy codes the general control data (422), quantized transform coefficient data (432), intra prediction data (442), motion data (452) and filter control data (462). For the motion data (452), the header formatter/entropy coder (490) can select and entropy code merge mode index values, or a default MV predictor can be used. In some cases, the header formatter/entropy coder (490) also determines MV differentials for MV values (relative to MV predictors), then entropy codes the MV differentials, e.g., using context-adaptive binary arithmetic coding.

The header formatter/entropy coder (490) provides the encoded data in the coded video bitstream (495). The format of the coded video bitstream (495) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

V. Types of Video

The approaches described herein for selecting MV precision, selectively disabling SAO filtering and determining which reference pictures to retain in an RPS can be applied when encoding any type of video. In particular, however, these approaches can improve performance when encoding certain artificially-created video content such as screen capture content.

Figure 5:
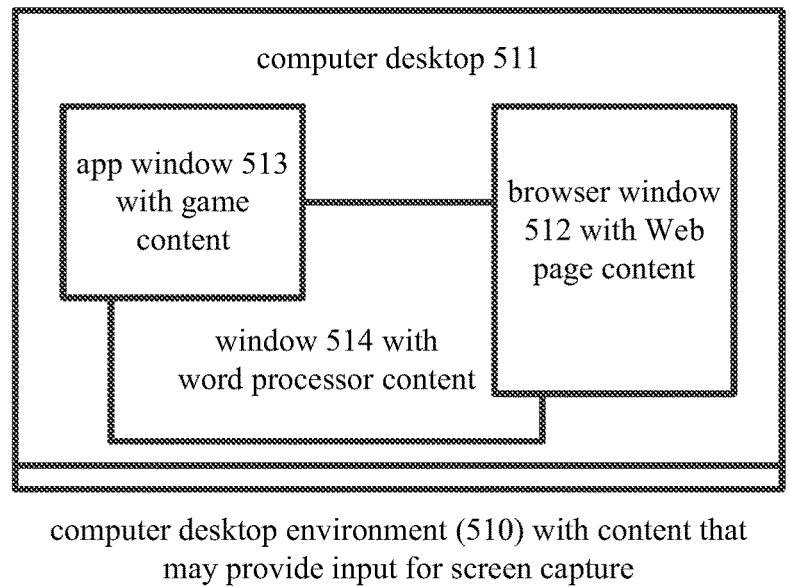
FIG. 5 is diagram illustrating a computer desktop environment with content that may provide input for screen capture.

In general, screen capture content represents the output of a computer screen or other display. FIG. 5 shows a computer desktop environment (510) with content that may provide input for screen capture. For example, video of screen capture content can represent a series of images of the entire computer desktop (511). Or, video of screen capture content can represent a series of images for one of the windows of the computer desktop environment, such as the app window (513) including game content, browser window (512) with Web page content or window (514) with word processor content.

As computer-generated, artificially-created video content, screen capture content tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from frame-to-frame, even if the content may be spatially displaced (e.g., due to scrolling). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

Figure 6:
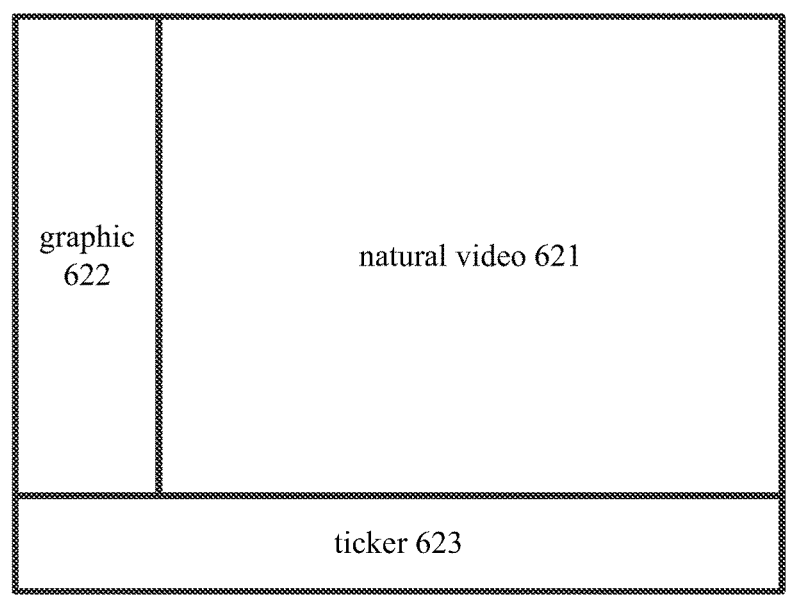
FIG. 6 is a diagram illustrating composite video with natural video content and artificially-created video content.

FIG. 6 shows composite video (620) that includes natural video content (621) and artificially-created video content. The artificially-created video content includes a graphic (622) beside the natural video content (621) and ticker (623) running below the natural video content (621). Like the screen capture content shown in FIG. 5, the artificially-created video content shown in FIG. 6 tends to have relatively few discrete sample values. It also tends to have distinct structures (e.g., graphics, text characters) that are exactly repeated from frame-to-frame or gradually offset from frame-to-frame (e.g., due to scrolling).

VI. Examples of Hash-Based Block Matching

In various innovations described herein, a video encoder uses the results of hash-based block matching when making decisions about parameters during encoding. This section describes examples of hash-based block matching.

A. Hash-Based Block Matching.

When an encoder uses hash-based block matching, the encoder determines a hash value for each of multiple candidate blocks of one or more reference pictures. A hash table stores the hash values for the candidate blocks. The encoder also determines a hash value for a current block by the same hashing approach, and then searches the hash table for a matching hash value. If two blocks are identical, their hash values are the same. Using hash values, an encoder can quickly and efficiently identify candidate blocks that have the same hash value as the current block, and filter out candidate blocks that have different hash values. Depending on implementation and the goals of the hash-based block matching, the encoder may then further evaluate those candidate blocks having the same hash value as the current block. (Different blocks can have the same hash value. So, among the candidate blocks with the same hash value, the encoder can further identify a candidate block that matches the current block.)

In some example implementations, hash values for candidate blocks are determined from the input sample values for the pictures (reference pictures) that include the candidate blocks. During hash-based block matching, the encoder determines the hash value for a current block using input sample values. The encoder compares it (or otherwise uses the hash value) against the hash values determined from input sample values for candidate blocks. Even so, reconstructed sample values from the matching block are used to represent the current block. Thus, prediction operations still use reconstructed sample values.

Alternatively, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks.

FIG. 7 illustrates hash values (700) for candidate blocks B(x, y) in hash-based block matching, where x and y indicate horizontal and vertical coordinates, respectively, for the top-left position of a given candidate block. The candidate blocks have hash values determined using a hash function h( ). For a candidate block B(x, y) in a reference picture, the encoder determines a hash value h(B) for the candidate block from input sample values for the reference picture. The encoder can determine hash values for all candidate blocks in the reference picture. Or, the encoder can screen out some candidate blocks.

In general, the hash function h( ) yields n possible hash values, designated $h_0$ to $h_{n-1}$. For a given hash value, the candidate blocks with that hash value are grouped. For example, in FIG. 7, the candidate blocks B(1266, 263), B(1357, 365), B(1429, 401), B(502, 464), . . . have the hash value $h_0$. Groups can include different numbers of candidate blocks. For example, in FIG. 7, the group for hash value $h_4$ includes a single candidate block, while the group for hash value $h_0$ includes more than four candidate blocks.

In this way, the possible candidate blocks are distributed into n categories. For example, if the hash function h( ) produces 12-bit hash values, the candidate blocks are split into $2^{12}$=4,096 categories. The number of candidate blocks per hash value can be further reduced by eliminating redundant, identical blocks with that hash value, or by screening out candidate blocks having certain patterns of sample values. Also, the encoder can iteratively winnow down the number of candidate blocks using different hash functions.

The hash function used for hash-based block matching depends on implementation. A hash function can produce hash values with 8 bits, 12 bits, 16 bits, 24 bits, 32 bits, or some other number of bits. If a hash value has fewer bits, the data structure includes fewer categories, but each category may include more candidate blocks. On the other hand, using hash values with more bits tends to increase the size of the data structure that organizes candidate blocks. If a hash value has more bits, the data structure includes more categories, but each category may include fewer candidate blocks. The hash function h( ) can be a cryptographic hash function, part of a cryptographic hash function, cyclic redundancy check ("CRC") function, part of a CRC, or another hash function (e.g., using averaging and XOR operations to determine the signature of a candidate block or current block). Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value.

During hash-based block matching, with the hash function h( ), the encoder determines the hash value for the current block $B_{current}$. In FIG. 7, the hash value $h(B_{current})$ is $h_3$. Using the hash value of the current block, the encoder can identify candidate blocks that have the same hash value (shown in outlined box in FIG. 7), and filter out the other candidate blocks. When a hash function maps similar blocks to different hash values, the identified candidate blocks (same hash value as the current block) include blocks that might be identical to the current block. When a hash function maps similar blocks to the same hash value, the identified candidate blocks (same hash value as the current block) include blocks that might be identical to the current block or might be close approximations of the current block. Either way, from these identified candidate blocks, the encoder can further identify a matching block for the current block (e.g., using sample-wise block matching operations, using a second hash function).

Overall, since hash value comparisons are much simpler than sample-wise block matching, hash-based block matching can make the process of evaluating the candidate blocks in reference picture(s) much more efficient. Also, hash values for candidate blocks can be reused in hash-based block matching for different blocks within a picture during encoding. In this case, the cost of computing the hash values for the candidate blocks can be amortized across hash-based block matching operations for the entire picture, for other pictures that use the same reference picture, and for other encoder-side decisions that use the hash values.

B. Data Structures for Hash-Based Block Matching.

In some example implementations, the encoder uses a data structure that organizes candidate blocks according to their hash values. The data structure can help make hash-based block matching more computationally efficient. The data structure implements, for example, a block hash dictionary or hash table as described herein.

FIG. 8a illustrates an example data structure (800) that organizes candidate blocks for hash-based block matching. For the hash function h( ), the n possible hash values are $h_0$ to $h_{n-1}$. Candidate blocks with the same hash value are classified in the same candidate block list. A given candidate block list can include zero or more entries. For example, the candidate block list for the hash value $h_2$ has no entries, the list for the hash value $h_6$ has two entries, and the list for the hash value $h_1$ has more than four entries.

An entry($h_i$, k) includes information for the $k^{th}$ candidate block with the hash value $h_i$. As shown in FIG. 8b, an entry in a candidate block list can include the address of a block B(x, y) (e.g., horizontal and vertical coordinates for the top-left position of the block). Or, as shown in FIG. 8c, an entry in a candidate block list can include the address of a block B(x, y) and a hash value from a second hash function, which can be used for iterative hash-based block matching.

During hash-based block matching for a current block, the encoder determines the hash value of the current block $h(B_{current})$. The encoder retains the candidate block list with the same hash value and rules out the other n−1 lists. To select the matching block, the encoder can compare the current block with the candidate block(s), if any, in the retained candidate block list. Thus, by a simple lookup operation using the hash value $h(B_{current})$, the encoder can eliminate (n−1)/n of the candidate blocks (on average), and focus on the remaining 1/n candidate blocks (on average) in the retained list, significantly reducing the number of sample-wise block matching operations.

Different data structures can be used for different reference pictures. Alternatively, an entry for a candidate block in the data structure stores information indicating the reference picture that includes the candidate block, which can be used in hash-based block matching.

Also, different data structures can be used for different sizes of blocks. For example, one data structure includes hash values for 8×8 candidate blocks, a second data structure includes hash values for 16×16 candidate blocks, a third data structure includes hash values for 32×32 candidate blocks, and so on. The data structure used during hash-based block matching depends on the size of the current block. Alternatively, a single, unified data structure can be used for different sizes of blocks. A hash function can produce an n-bit hash value, where m bits of the n-bit hash value indicate a hash value among the possible blocks of a given block size according to an m-bit hash function, and the remaining n-m bits of the n-bit hash value indicate the given block size. For example, the first two bits of a 14-bit hash function can indicate a block size, while the remaining 12 bits indicate a hash value according to a 12-bit hash function. Or, a hash function can produce an m-bit hash value regardless of the size of the block, and an entry for a candidate block in the data structure stores information indicating the block size for the candidate block, which can be used in hash-based block matching.

For a high-resolution picture, the data structure can store information representing a very large number of candidate blocks. To reduce the amount of memory used for the data structure, the encoder can eliminate redundant values. For example, the encoder can skip adding identical blocks to the data structure. In general, reducing the size of the data structure by eliminating identical blocks can hurt coding efficiency. Thus, by deciding whether to eliminate identical blocks, the encoder can trade off memory size for the data structure and coding efficiency. The encoder can also screen out candidate blocks, depending on the content of the blocks.

C. Iterative Hash-Based Block Matching.

When the encoder uses a single hash function with n possible hash values, the encoder can rule out n−1 lists of candidate blocks based on the hash value of a current block, but the encoder may still need to perform sample-wise block matching operations for the remaining candidate block(s), if any, for the list with the matching hash value. Also, when updating a data structure that organizes candidate blocks, the encoder may need to perform sample-wise block matching operations to identify identical blocks. Collectively, these sample-wise block matching operations can be computationally intensive.

Therefore, in some example implementations, the encoder uses iterative hash-based block matching. Iterative hash-based block matching can speed up the block matching process and also speed up the process of updating a data structure that organizes candidate blocks.

Iterative hash-based block matching uses multiple hash values determined with different hash functions. For a block B (current block or candidate block), in addition to the hash value h(B), the encoder determines another hash value h'(B) using a different hash function h'( ). With the first hash value $h(B_{current})$ for a current block, the encoder identifies candidate blocks that have the same hash value for the first hash function h( ). To further rule out some of these identified candidate blocks, the encoder uses a second hash value h'($B_{current}$) for the current block, which is determined using a different hash function. The encoder compares the second hash value h'($B_{current}$) with the second hash values for the previously identified candidate blocks (which have same first hash value), in order to filter out more of the candidate blocks. A hash table tracks hash values for the candidate blocks according to the different hash functions.

In the example of FIG. 8a, if h($B_{current}$)=$h_3$, the encoder selects the candidate blocks with entry(3, 0), entry (3, 1), entry(3, 2), entry(3, 3), . . . for further refinement. As shown in FIG. 8c, for a candidate block B, an entry includes a block address and a second hash value h'(B) from the hash function h'( ). The encoder compares the second hash value h'($B_{current}$) for the current block with the second hash values h'(B) for the respective candidate blocks with entry(3, 0), entry (3, 1), entry(3, 2), entry(3, 3), . . . . Based on results of the second hash value comparisons, the encoder can rule out more of the candidate blocks, leaving candidate blocks, if any, that have first and second hash values matching h($B_{current}$) and h'($B_{current}$), respectively. The encoder can perform sample-wise block matching on any remaining candidate blocks to select a matching block.

FIGS. 9a-9c show another example of iterative hash-based block matching that uses a different data structure. The data structure (900) in FIG. 9a organizes candidate blocks by first hash value from a first hash function h( ), which has n1 possible hash values. The data structure (900) includes lists for hash values from $h_0$ . . . $h_{n1-1}$. In the example, the encoder determines a first hash value h($B_{current}$)=$h_2$ for the current block, and selects the list for $h_2$ from the structure (900).

As shown in FIG. 9b, the list (910) for $h_2$ includes multiple lists that further organize the remaining candidate blocks by second hash value from a second hash function h which has n2 possible hash values. The list (910) includes lists for hash values from h'$_0$ . . . h'$_{n2-1}$, each including entries with block addresses (e.g., horizontal and vertical coordinates for top-left positions of respective candidate blocks), as shown for the entry (920) in FIG. 9c. In the example, the encoder determines a second hash value h'($B_{current}$)=h'$_0$ for the current block, and selects the list for h'$_0$ from the list (910). For the candidate blocks in the list for h'$_0$, the encoder can perform sample-wise block matching to select a matching block. In this example, the lists for the second hash values are specific to a given list for the first hash value. Alternatively, there is one set of lists for the second hash values, and the encoder identifies any candidate blocks that are (1) in the matching list for the first hash values and also (2) in the matching list for the second hash values.

Aside from hash-based block matching, the second hash function h'( ) can be used to simplify the process of updating a data structure that organizes candidate blocks. For example, when the encoder checks whether a new candidate block is identical to a candidate block already represented in the data structure, the encoder can use multiple hash values with different hash functions to filter out non-identical blocks. For remaining candidate blocks, the encoder can perform sample-wise block matching to identify any identical block.

In the preceding examples, the iterative hash-based block matching and updating use two different hash functions. Alternatively, the encoder uses three, four or more hash functions to further speed up hash-based block matching or filter out non-identical blocks, and thereby reduce the number of sample-wise block matching operations. Also, for a low-complexity encoder or for faster decision-making processes, the encoder can skip sample-wise block matching operations when hash values match. For hash functions with a large number of possible hash values, there is a high probability that two blocks are identical if hash values for the two blocks match. In particular, in some example implementations of encoder-side decisions described below, the encoder considers, as the results of hash-based block matching, whether hash values match, but does not perform any sample-wise block matching operations.

VII. Selection of MV Precision

This section presents various approaches to selection of motion vector ("MV") precision during encoding, depending on the results of hash-based block matching (e.g., matching hash values). By selecting appropriate MV precisions during encoding, these approaches can facilitate compression that is effective in terms of rate-distortion performance and/or computational efficiency of encoding and decoding.

A. Different MV Precisions.

When encoding artificially-created video content, MV values usually represent integer-sample spatial displacements, and very few MV values represent fractional-sample spatial displacements. This provides opportunities for reducing MV precision to improve overall performance.

Figure 10A:
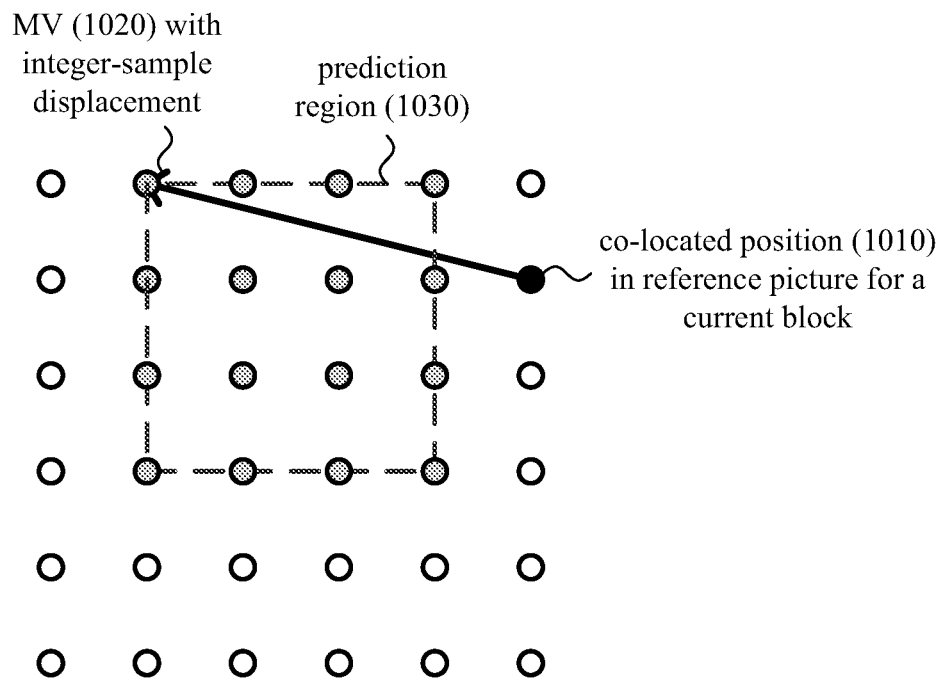
FIGS. 10a and 10b are diagrams illustrating motion compensation with MV values having an integer-sample spatial displacement and fractional-sample spatial displacement, respectively.

FIG. 10a shows motion compensation with an MV (1020) having an integer-sample spatial displacement. The MV (1020) indicates a spatial displacement of four samples to the left, and one sample up, relative to the co-located position (1010) in a reference picture for a current block. For example, for a 4×4 current block at position (64, 96) in a current picture, the MV (1020) indicates a 4×4 prediction region (1030) whose position is (60, 95) in the reference picture. The prediction region (1030) includes reconstructed sample values at integer-sample positions in the reference picture. An encoder or decoder need not perform interpolation to determine the values of the prediction region (1030).

Figure 10B:
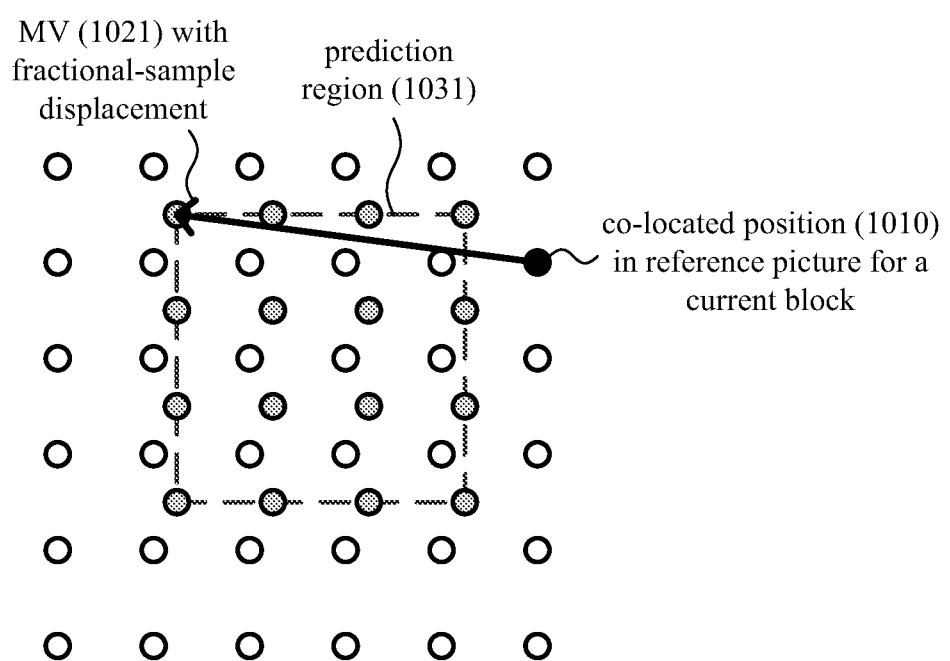

FIG. 10b shows motion compensation with an MV (1021) having a fractional-sample spatial displacement. The MV (1021) indicates a spatial displacement of 3.75 samples to the left, and 0.5 samples up, relative to the co-located position (1010) in a reference picture for a current block. For example, for a 4×4 current block at position (64, 96) in a current picture, the MV (1021) indicates a 4×4 prediction region (1031) whose position is (60.25, 95.5) in the reference picture. The prediction region (1031) includes interpolated sample values at fractional-sample positions in the reference picture. An encoder or decoder performs interpolation to determine the sample values of the prediction region (1031). When fractional-sample spatial displacements are allowed, there are more candidate prediction regions that may match a current block, and thus the quality of motion-compensated prediction usually improves, at least for some types of video content (e.g., natural video content).

B. Representation of MV Values.

MV values are typically represented using integer values whose meaning depends on MV precision. For integer-sample MV precision, for example, an integer value of 1 indicates a spatial displacement of 1 sample, an integer value of 2 indicates a spatial displacement of 2 samples, and so on. For ¼-sample MV precision, for example, an integer value of 1 indicates a spatial displacement of 0.25 samples. Integer values of 2, 3, 4 and 5 indicate spatial displacements of 0.5, 0.75, 1.0 and 1.25 samples, respectively. Regardless of MV precision, the integer value can indicate a magnitude of the spatial displacement, and separate flag value can indicate whether displacement is negative or positive. The horizontal MV component and vertical MV component of a given MV value can be represented using two integer values. Thus, the meaning of two integer values representing an MV value depends on MV precision. For example, for an MV value having a 2-sample horizontal displacement and no vertical displacement, if MV precision is ¼-sample MV precision, the MV value is represented as (8, 0). If MV precision is integer-sample MV precision, however, the MV value is represented as (2, 0).

MV values in a bitstream of encoded video data are typically entropy coded (e.g., on an MV-component-wise basis). An MV value may also be differentially encoded relative to a predicted MV value (e.g., on an MV-component-wise basis). In many cases, the MV value equals the predicted MV value, so the differential MV value is zero, which can be encoded very efficiently. A differential MV value (or MV value, if MV prediction is not used) can be entropy encoded using Exponential-Golomb coding, context-adaptive binary arithmetic coding or another form of entropy coding. Although the exact relationship between MV value (or differential MV value) and encoded bits depends on the form of entropy coding used, in general, smaller values are encoded more efficiently (that is, using fewer bits) because they are more common, and larger values are encoded less efficiently (that is, using more bits) because they are less common.

C. Adaptive MV Precision—Introduction.

To summarize the preceding two sections, using MV values with integer-sample MV precision tends to reduce bit rate associated with signaling MV values and reduce computational complexity of encoding and decoding (by avoiding interpolation of sample values at fractional-sample positions in reference pictures), but may reduce the quality of motion-compensated prediction, at least for some types of video content. On the other hand, using MV values with fractional-sample MV precision tends to increase bit rate associated with signaling MV values and increase computational complexity of encoding and decoding (by including interpolation of sample values at fractional-sample positions in reference pictures), but may improve the quality of motion-compensated prediction, at least for some types of video content. In general, computational complexity, bit rate for signaling MV values, and quality of motion-compensated prediction increase as MV precision increases (e.g., from integer-sample to ½-sample, or from ½-sample to ¼-sample), up to a point of diminishing returns.

When encoding artificially-created video content, the added costs of fractional-sample MV precision (in terms of bit rate and computational complexity) may be unjustified. For example, if most MV values represent integer-sample spatial displacements, and very few MV values represent fractional-sample spatial displacements, the added costs of fractional-sample MV precision are not warranted. The encoder can skip searching at fractional-sample positions (and interpolation operations to determine sample values at those positions) during motion estimation. For such content, bit rate and computational complexity can be reduced, without a significant penalty to the quality of motion-compensated prediction, by using MV values with integer-sample MV precision.

Since fractional-sample MV precision may still be useful for other types of video content (e.g., natural video captured by camera), an encoder and decoder can be adapted to switch between MV precisions. For example, an encoder and decoder can use integer-sample MV precision for artificially-created video content, but use a fractional-sample MV precision (such as ¼-sample MV precision) for natural video content. Approaches that an encoder may follow when selecting MV precision are described in the next section. The encoder can signal the selected MV precision to the decoder using one or more syntax elements in the bitstream.

In one approach to signaling MV precision, when adaptive selection of MV precision is enabled, the encoder selects an MV precision on a slice-by-slice basis. A flag value in a sequence parameter set ("SPS"), picture parameter set ("PPS") or other syntax structure indicates whether adaptive selection of MV precision is enabled. If so, one or more syntax elements in a slice header for a given slice indicate the selected MV precision for blocks of that slice. For example, a flag value of 0 indicates ¼-sample MV precision, and a flag value of 1 indicates integer-sample MV precision.

In another approach to signaling MV precision, the encoder selects an MV precision on a picture-by-picture basis or slice-by-slice basis. A syntax element in a PPS indicates one of three MV precision modes: (0) ¼-sample MV precision for MV values of slice(s) of a picture associated with the PPS, (1) integer-sample MV precision for MV values of slice(s) of a picture associated with the PPS, or (2) slice-adaptive MV precision depending on a flag value signaled per slice header, where the flag value in the slice header can indicate ¼-sample MV precision or integer-sample MV precision for MV values of the slice.

In still another approach to signaling MV precision, when adaptive selection of MV precision is enabled, the encoder selects an MV precision on a CU-by-CU basis. One or more syntax elements in a structure for a given CU indicate the selected MV precision for blocks of that CU. For example, a flag value in a CU syntax structure for a CU indicates whether MV values for all PUs associated with the CU have integer-sample MV precision or ¼-sample MV precision.

In any of these approaches, the encoder and decoder can use different MV precisions for horizontal and vertical MV components. This can be useful when encoding artificially-created video content that has been scaled horizontally or vertically (e.g., using integer-sample MV precision in an unscaled dimension, and using a fractional-sample MV precision in a scaled dimension). In some example implementations, if rate control cannot be achieved solely through adjustment of QP values, an encoder may resize video horizontally or vertically to reduce bit rate, then encode the resized video. At the decoder side, the video is scaled back to its original dimensions after decoding. The encoder can signal the MV precision for horizontal MV components and also signal the MV precision for vertical MV components to the decoder.

More generally, when adaptive selection of MV precision is enabled, the encoder selects an MV precision and signals the selected MV precision in some way. For example, a flag value in a SPS, PPS or other syntax structure can indicate whether adaptive selection of MV precision is enabled. When adaptive MV precision is enabled, one or more syntax elements in sequence-layer syntax, GOP-layer syntax, picture-layer syntax, slice-layer syntax, tile-layer syntax, block-layer syntax or another syntax structure can indicate the selected MV precision for horizontal and vertical components of MV values. Or, one or more syntax elements in sequence-layer syntax, GOP-layer syntax, picture-layer syntax, slice-header-layer syntax, slice-data-layer syntax, tile-layer syntax, block-layer syntax or another syntax structure can indicate MV precisions for different MV components. When there are two available MV precisions, a flag value can indicate a selection between the two MV precisions. Where there are more available MV precisions, an integer value can a selection between those MV precisions.

Aside from modifications to signal/parse the syntax elements that indicate selected MV precision(s), decoding can be modified to change how signaled MV values are interpreted depending on the selected MV precision. The details of how MV values are encoded and reconstructed can vary depending on MV precision. For example, when the MV precision is integer-sample precision, predicted MV values can be rounded to the nearest integer, and differential MV values can indicate integer-sample offsets. Or, when the MV precision is ¼-sample precision, predicted MV values can be rounded to the nearest ¼-sample offset, and differential MV values can indicate ¼-sample offsets. Or, MV values can be signaled in some other way. When MV values have integer-sample MV precision and the video uses 4:2:2 or 4:2:0 chroma sampling, chroma MV values can be derived by scaling, etc., which may result in ½-sample displacements for chroma. Or, chroma MV values can be rounded to integer values.

Alternatively, the encoder does not change how MV values are predicted or how MV differences are signaled in the bitstream, nor does the decoder change how MV values are predicted or how MV differences are reconstructed, but the interpretation of reconstructed MV values changes depending on the selected MV precision. If the selected MV precision is integer-sample precision, a reconstructed MV value is scaled by a factor of 4 before being used in a motion compensation process (which operates at quarter-sample precision). If the selected MV precision is quarter-sample precision, the reconstructed MV value is not scaled before being used in the motion compensation process.

D. Selecting MV Precision Using Results of Hash-Based Block Matching.

When MV precision can be adapted during video encoding, an encoder selects an MV precision for a unit of video (e.g., the MV precision for one or both components of MV values for the unit). The encoder can select the MV precision to use depending on the results of hash-based block matching (e.g., matching hash values). The selection of the MV precision can also depend on other factors, such as classification of blocks as natural video content or artificially-created video content. These approaches can provide a computationally-efficient way to select appropriate MV precisions.

1. Example Techniques for Selecting MV Precision

FIG. 11 shows a generalized technique (1100) for selecting MV precision depending on the results of hash-based block matching. The technique (1100) can be performed by an encoder such as one described with reference to FIG. 3 or FIGS. 4a and 4b, or by another encoder.

The encoder encodes (1110) video to produce encoded data, then outputs (1120) the encoded data in a bitstream. As part of the encoding (1110), the encoder determines an MV precision for a unit of the video based at least in part on the results of hash-based block matching. The MV precision can apply for one or both components of MV values. The hash-based block matching can use a hash table as described in section VI or use another hash table. For example, if at least a threshold number of blocks of the unit of the video have matching blocks identified in the hash-based block matching (according to matching hash values, without performing sample-wise block matching), the encoder selects integer-sample MV precision. Otherwise, the encoder selects a fractional-sample MV precision.

FIG. 12 shows a more specific technique (1200) for adapting MV precision during encoding, where MV precision is selected depending on the results of hash-based block matching. The technique (1200) can be performed by an encoder such as one described with reference to FIG. 3 or FIGS. 4a and 4b, or by another encoder.

According to the technique (1200), during encoding of video, the encoder determines an MV precision from among multiple MV precisions for units of the video. Specifically, when encoding a unit of video, the encoder determines (1210) whether to change MV precision. At the start of encoding, the encoder can initially set the MV precision according to a default value, or proceed as if changing the MV precision. For later units of video, the encoder may use the current MV precision (which was used for one or more previously encoded units) or change the MV precision. For example, the encoder can decide to change MV precision upon the occurrence of a defined event (e.g., after encoding of a threshold number of units, after a scene change, after a determination that the type of video has changed).

To change the MV precision, the encoder determines (1220) the MV precision for the unit of video based at least in part on the results of hash-based block matching. For example, the encoder splits the unit into multiple blocks. For a given block of the multiple blocks, the encoder determines a hash value, then determines whether there is a match for it among multiple candidate blocks of one or more reference pictures. The encoder can evaluate a single reference picture (e.g., first reference picture in a reference picture list) or multiple reference pictures (e.g., each reference picture in the reference picture list). The match can signify matching hash values between the given block and one of the multiple candidate blocks. (That is, only hash values are checked.) Or, the match can further signify sample-by-sample matching between the given block and the one of the multiple candidate blocks. (That is, sample-wise comparisons confirm the match.) Considering hash values only is faster, but potentially less reliable since hash values from non-identical blocks can match. The hash-based block matching can use a hash table as described in section VI or use another hash table. If at least a threshold number of blocks of the unit have matching blocks identified in the hash-based block matching, the encoder can select integer-sample MV precision. Otherwise, the encoder can select a fractional-sample MV precision (such as quarter-sample MV precision).

Whether or not the MV precision has changed, the encoder encodes (1230) the unit using the selected MV precision. MV values of blocks (e.g., prediction units, macroblocks, or other blocks) within the unit of the video have the selected MV precision. The encoder outputs encoded data for the current unit in a bitstream. The encoded data can include syntax elements that indicate the selected MV precision.

The encoder decides (1240) whether to continue with the next unit. If so, the encoder decides (1210) whether to change the MV precision for the next unit. Thus, MV precision can be selected for each unit. Or, to reduce complexity, the MV precision for a unit can be changed from time-to-time (e.g., periodically or upon the occurrence of a defined event), then repeated for one or more subsequent units.

In the techniques (1100, 1200) of FIGS. 11 and 12, the unit of video can be a sequence, series of pictures between scene changes, group of pictures, picture, slice, tile, CU, PU, other block or other type of unit of video. Depending on a desired tradeoff between complexity and flexibility, the encoder can select MV precision on a highly-local basis (e.g., CU-by-CU basis), a larger region-by-region basis (e.g., tile-by-tile basis or slice-by-slice basis), whole picture basis, or more global basis (e.g., per encoding session, per sequence, per GOP, or per series of pictures between detected scene changes).

In the techniques (1100, 1200) of FIGS. 11 and 12, the encoder can select between using ¼-sample MV precision and integer-sample MV precision. More generally, the encoder selects between multiple available MV precisions, which can include integer-sample MV precision, ½-sample MV precision, ¼-sample MV precision and/or another MV precision. The selected MV precision can apply for horizontal components and/or vertical components of MV values for the unit of video.

In the techniques (1100, 1200) of FIGS. 11 and 12, the hash-based block matching uses hash values determined from input sample values of the unit and (for candidate blocks) input sample values for one or more reference pictures. Alternatively, for candidate blocks represented in a hash table, the hash-based block matching can use hash values determined from reconstructed sample values.

In the techniques (1100, 1200) of FIGS. 11 and 12, when determining the MV precision for a unit of video, the encoder can also consider other factors, such as whether non-matched blocks contain a significant amount of natural video content (camera-captured video), as described in the next sections.

2. Classifying Non-Matched Blocks

This section presents various ways to classify a non-matched block as natural, camera-captured video content or artificially-created video content (such as screen capture content). When determining the MV precision for a unit of video, hash-based block matching may fail to find a matching block for at least some of the blocks of the unit. For a non-matched block among the blocks of the unit, the encoder can classify the non-matched block as containing natural video content or artificially-created video content. By providing a high-probability way to differentiate natural video content from artificially-created video content in non-matched blocks, the encoder can select a more appropriate MV precision.

FIG. 13 shows characteristics of typical blocks of natural video content and screen capture content, which depict the same general pattern. The block (1310) of natural video content includes gradually changing sample values and irregular lines. In contrast, the block (1320) of artificially-created video content includes sharper lines and patterns of uniform sample values. Also, the number of different color values varies between the block (1310) of natural video content and block (1320) of screen capture content. The block (1320) of screen capture content includes three colors, and the block (1310) of natural video content includes many more different colors.

FIG. 14 shows a technique (1400) for classifying a block of video depending on a measure of the number of different colors in the block. The technique (1400) can be performed by an encoder such as one described with reference to FIG. 3 or FIGS. 4a and 4b, or by another encoder.

To start, the encoder measures (1410) the number of different colors in the non-matched block. For example, the encoder counts the distinct colors among sample values in the block. Or, the encoder counts the distinct colors among sample values in the block after clustering of the sample values into fewer colors (e.g., quantizing the sample values such that similar sample values become the same sample value). Or, the encoder measures the number of different colors in the block in some other way. The sample values can be organized as a histogram or organized in some other way.

The way the encoder measures the number of different colors in the block depends on the color space used. If the color space is YUV (e.g., YCbCr, YCoCg), for example, the encoder can count different Y values in the unit of video. Or, the encoder can count different YUV triplets (that is, distinct combinations of Y, U and V sample values for pixels at locations). If the color space is RGB (or GBR or BGR), the encoder can count sample values in one color component or multiple color components. Or, the encoder can count different triplets (that is, distinct combinations of R, G and B sample values for pixels at locations).

Then, the encoder compares (1420) the number of different colors in the non-matched block to a threshold count. The value of the threshold count depends on implementation and can be, for example, 5, 8, 10, 20, or 50. The threshold count can be the same for all sizes of units (e.g., regardless of block size). Or, the threshold count can be different for different unit sizes (e.g., different block sizes). The threshold can be pre-defined and static, or the threshold can be adjustable (tunable). In any case, the presence of a small number of discrete sample values in a non-matched block tends to indicate screen capture content, and the presence of a large number of discrete sample values in a non-matched block tends to indicate natural video content.

If the number of different colors is greater than the threshold, the encoder classifies (1440) the block as natural video content. If the number of different colors is less than the threshold, the encoder classifies (1430) the block as artificially-created video content. The boundary condition (count equals threshold) can be handled using either option, depending on implementation. The encoder repeats the technique (1400) on a block-by-block basis for non-matched blocks of the unit. In some example implementations, when more than a defined proportion of the non-matched blocks of the unit are classified as natural video content, the encoder selects a fractional-sample MV precision, since integer-sample MV precision is primarily useful when encoding artificially-created video content.

Alternatively, the encoder otherwise considers statistics from the collected sample values of a non-matched block. For example, the encoder determines whether the x most common collected sample values account for more than y % of the sample values. The values of x and y depend on implementation. The value of x can be 10 or some other count. The value of y can be 80, 90 or some other percentage less than 100. If the x most common sample values account for more than y % of the sample values in the block, the block is classified as containing artificially-created video content. Otherwise, the block is classified as containing natural video content.

3. Example Decision-Making Processes

Figure 15:
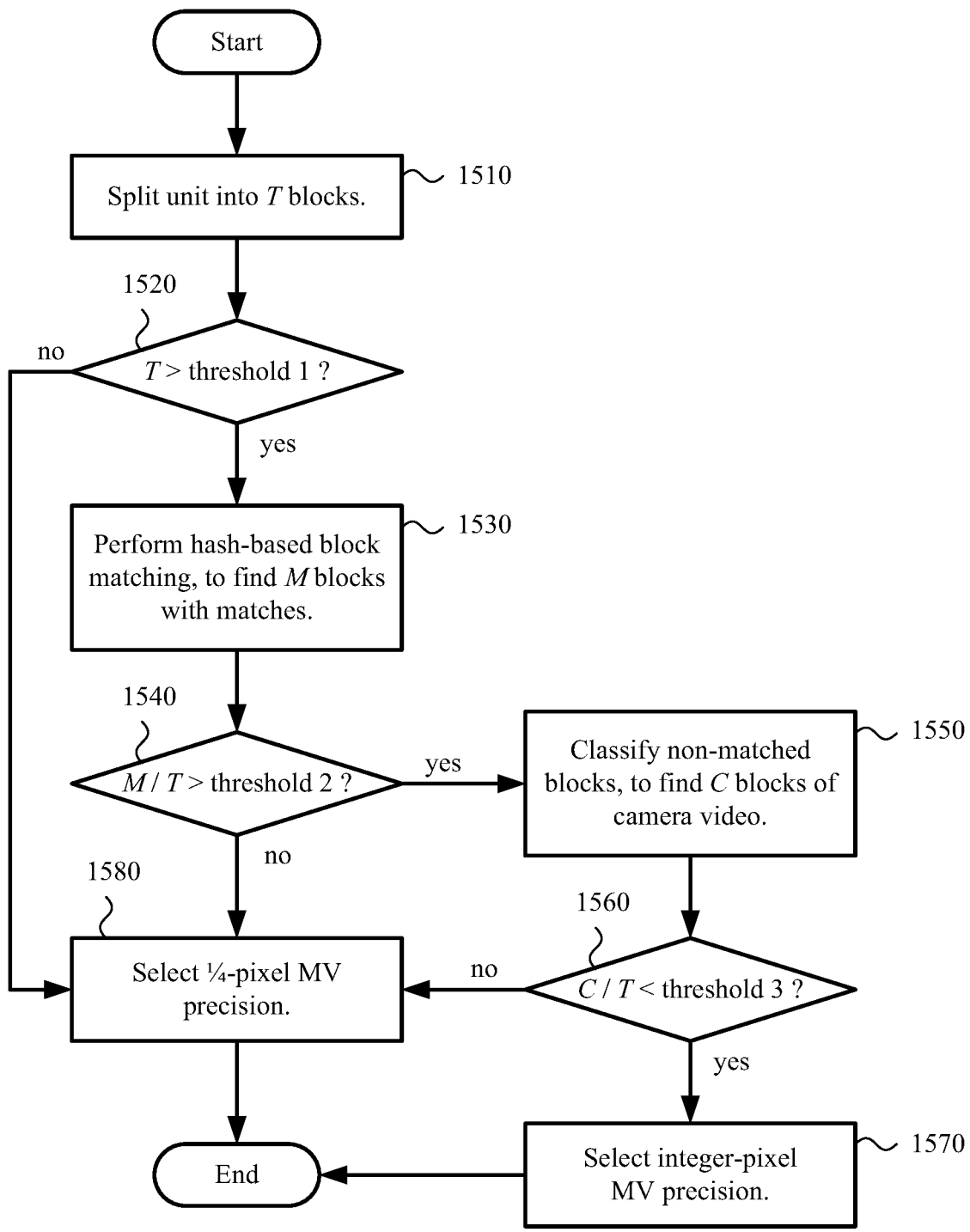

FIG. 15 shows an example technique (1500) for selecting MV precision depending on the results of hash-based block matching and further depending on classification of non-matched blocks. The technique (1500) can be performed by an encoder such as one described with reference to FIG. 3 or FIGS. 4a and 4b, or by another encoder.

The encoder splits (1510) a unit of video into T blocks. For example, the T blocks are non-overlapped M×N blocks.

In some example implementations, the M×N blocks are 8×8 blocks. Alternatively, the M×N blocks have another size.

The encoder compares (1520) T to a block count threshold. In the example implementations, the block count threshold is 10. Alternatively, the block count threshold has another value. The block count threshold can be pre-defined and static, or the block count threshold can be adjustable (tunable). The block count threshold ensures that the encoder considers a sufficient number of blocks when selecting the MV precision for the unit. If T is less than the block count threshold, the encoder selects (1580) quarter-sample MV precision for the unit. The boundary condition (T equals the block count threshold) can be handled using this option or the other option, depending on implementation.

If T is greater than the block count threshold, the encoder performs (1530) hash-based block matching for the T blocks of the unit. For each of the T blocks, the encoder calculates a hash value and finds if there is a candidate block of a reference picture that has an identical hash value. Of the T blocks of the unit, the encoder finds M blocks that have matching blocks (according to matching hash values) in the hash-based block matching. This leaves T M non-matched blocks.

The encoder compares (1540) the proportion M/T to a matched block threshold. In the example implementations, the matched block threshold is 25%. Alternatively, the matched block threshold has another value. The matched block threshold can be pre-defined and static, or the matched block threshold can be adjustable (tunable). The matched block threshold ensures that a sufficient number of matched blocks has been found when selecting the MV precision for the unit. If M/T is less than the matched block threshold, the encoder selects (1580) quarter-sample MV precision for the unit. The boundary condition (M/T equals the matched block threshold) can be handled using this option or the other option, depending on implementation. Alternatively, instead of using M/T, the encoder compares some other measure that relates to the number of matched blocks to a threshold.

If M/T is greater than the matched block threshold, the encoder classifies (1550) each the T−M non-matched blocks into one of two categories depending on the histogram of color values (number of different colors) in the block. The two categories are (1) natural video content, for blocks more likely to contain camera-captured video content, and (2) artificially-created video content, for blocks more likely to contain screen capture content. Of the T−M non-matched blocks of the unit, the encoder finds C blocks that are classified as natural video content, and S blocks that are classified as artificially-created video content. T=M+C+S.

For example, for a given non-matched block, the encoder counts the number of different colors contained in the block. When counting the number of different colors, the encoder can count a single color component (e.g., luma, G) or count all of the color components (e.g., luma and chroma; R, G and B). The encoder compares the count to a color threshold, whose value depends on implementation. In the example implementations, the color threshold is 8 for an 8×8 block. Alternatively, the color threshold has another value. The color threshold can be the same for all sizes of blocks. Or, the color threshold can be different for different block sizes. The color threshold can be pre-defined and static, or the color threshold can be adjustable (tunable). If the count is less than the color threshold, the non-matched block is classified as artificially-created video content. If the count is greater than the color threshold, the non-matched block is classified as natural video content. The boundary condition (count equals the color threshold) can be handled using either option, depending on implementation.

The encoder compares (1560) the proportion C/T to a natural video block threshold. In the example implementations, the natural video block threshold is 3%. Alternatively, the natural video block threshold has another value. The natural video block threshold can be pre-defined and static, or the natural video block threshold can be adjustable (tunable). The natural video block threshold ensures that integer-sample MV precision is not selected if there are too many blocks of natural video content. If C/T is greater than the natural video block threshold, the encoder selects (1580) quarter-sample MV precision for the unit. If C/T is less than the natural video block threshold, the encoder selects (1570) integer-sample MV precision for the unit. The boundary condition (C/T equals the natural video block threshold) can be handled using either option, depending on implementation. Alternatively, instead of using C/T, the encoder compares some other measure that relates to the number of natural video blocks to a threshold.

Thus, the encoder selects the MV precision based on one or more of: (a) a comparison of a number of the multiple blocks to a blocks threshold, (b) a comparison of a measure of the multiple blocks that have matching blocks from the hash-based block matching to a matched blocks threshold, and (c) a comparison of a measure of the multiple blocks classified as natural video content to a natural video blocks threshold. For example, the encoder selects integer-sample MV precision if: (a) the number of the multiple blocks greater than the blocks threshold, (b) the measure of the multiple blocks that have matching blocks from the hash-based block matching is greater than the matched blocks threshold, AND (c) the measure of the multiple blocks classified as natural video content is less than the natural video blocks threshold. Otherwise, when any of these conditions (a)-(c) is not satisfied, the encoder selects quarter-sample MV precision. As noted, handling of the boundary conditions depends on implementation.

4. Alternatives and Variations

When the encoder uses the same pattern of tiles from picture-to-picture, the encoder can repeat per-tile MV precisions from picture-to-picture. Co-located tiles from picture-to-picture can use the same MV precision. Similarly, co-located slices from picture-to-picture can use the same MV precision. For example, suppose video depicts a computer desktop, and part of the desktop has a window displaying natural video content. A fractional-sample MV precision may be used within that region of the desktop from picture-to-picture, whether other areas that show text or other rendered content are encoded using integer-sample MV precision.

The encoder can adjust an amount of bias towards or against integer-sample MV precision based at least in part on a degree of confidence that integer-sample MV precision is appropriate. The encoder can also adjust an amount of bias towards or against integer-sample MV precision based at least in part on target computational complexity of encoding and/or decoding (favoring integer-sample MV precision to reduce computational complexity). For example, the encoder can adjust thresholds used in comparison operations to make it more likely or less likely that integer-sample MV precision is selected.

The selected MV precision can be for horizontal MV components and/or vertical MV components of the MV values of blocks within the unit of the video, where the horizontal MV components and vertical MV components are permitted to have different MV precisions. Or, the selected MV precision can be for both horizontal MV components and vertical MV components of the MV values of blocks within the unit of the video, where the horizontal MV components and vertical MV components have the same MV precision.

In most of the preceding examples of selection of MV precision, the encoded video in the bitstream includes one or more syntax elements that indicate the selected MV precision for the unit. A decoder parses the syntax element(s) indicating the selected MV precision and interprets MV values according to the selected MV precision. Alternatively, the encoded video in the bitstream can lack any syntax elements that indicate the selected MV precision. For example, even if the bitstream supports signaling of MV values with a fractional-sample MV precision, the encoder can constrain motion estimation for the unit of the video to use only MV values with fractional parts of zero, and only MV values that indicate integer-sample offsets are used in motion compensation. A decoder reconstructs and applies MV values at the fractional-sample MV precision (where the MV values indicate integer-sample offsets). This may reduce computational complexity of decoding by avoiding interpolation operations.

VIII. Selectively Disabling SAO Filtering

This section presents various approaches to selectively disabling sample adaptive offset ("SAO") filtering depending on the results of hash-based block matching (e.g., matching hash values). By disabling SAO filtering when it is unlikely to be effective, these approaches can facilitate compression that is effective in terms of rate-distortion performance and/or computational efficiency of encoding and decoding.

A. SAO Filtering.

SAO filtering involves non-linear filtering operations that can be used, for example, to enhance edge sharpness or suppress banding artifacts or ringing artifacts. Within a region, SAO filtering can be adaptively applied to sample values that satisfy certain conditions, such as presence of a gradient across the sample values.

According to the H.265/HEVC standard, SAO filtering can be enabled or disabled for a sequence. Specifically, whether SAO filtering is performed for pictures of a sequence can be controlled by a syntax element in the SPS. If sample_adaptive_offset_enabled_flag is 1, SAO filtering may be applied to slices of reconstructed pictures after deblocking filtering. If sample_adaptive_offset_enabled_flag is 0, SAO filtering is not applied.

According to the H.265/HEVC standard, when enabled for a sequence, SAO filtering can be enabled or disabled on a slice-by-slice basis for luma content of a slice and/or chroma content of the slice. Specifically, two slice segment header flags control SAO filtering for a slice. If slice_sao_luma_flag is 1, SAO filtering is enabled for the luma component of the slice. If slice_sao_luma_flag is 0 (default value, if not present), SAO filtering is disabled for the luma component of the slice. If slice_sao_chroma_flag is 1, SAO filtering is enabled for the chroma component of the slice. If slice_sao_chroma_flag is 0 (default value, if not present), SAO filtering is disabled for the chroma component of the slice.

Further, according to the H.265/HEVC standard, SAO filtering can be enabled or disabled for CTBs of a CTU in a slice, where a CTU typically includes a luma CTB and corresponding chroma CTBs. For a CTB, a type index (sao_type_idx_luma or sao_type_idx_chroma) indicates whether SAO filtering is disabled, uses band offsets, or uses edge offsets. If the type index is 0, SAO filtering is disabled for the CTB. If the type index is 1, the type of SAO filtering used for the CTB is band offset. Finally, if the type index is 2, the type of SAO filtering used for the CTB is edge offset. In some cases, a CTB can reuse syntax elements from an adjacent CTB to control SAO filtering.

For band-offset SAO filtering according to the H.265/HEVC standard, the relevant sample value range is split into 32 bands. Sample values in four consecutive bands are modified by adding band offsets. A syntax element indicates the starting position of the bands to be modified, and other syntax elements indicate the band offsets.

For edge-offset SAO filtering according to the H.265/HEVC standard, a syntax element (sao_eo_class) indicates whether a horizontal, vertical, 45 degree or 135 degree gradient is used in SAO filtering. Each sample value of a CTB is classified based on relations to its neighbor sample values along the selected gradient (e.g., classified as a flat area, local minimum, edge, or local maximum). For categories other than "flat area," an offset (indicated by syntax elements in the bitstream) is added to the sample value.

SAO filtering can enhance edge sharpness and suppress certain types of artifacts, but it increases the computational complexity of encoding and decoding, and it consumes some bits signaling SAO parameters. When encoding artificially-created video content, the added costs of SAO filtering (in terms of bit rate and computational complexity) may be unjustified. For example, if blocks of a screen content region of a current picture are predicted well using candidate blocks in a reference picture, and the expected quality of the blocks is at least as good as the quality of the candidate blocks in the reference picture, SAO filtering may fail to improve quality. For such content, bit rate and computational complexity can be reduced, without a significant penalty to quality, by disabling SAO filtering.

B. Selectively Disabling SAO Filtering Using Results of Hash-Based Block Matching.

Figure 16:
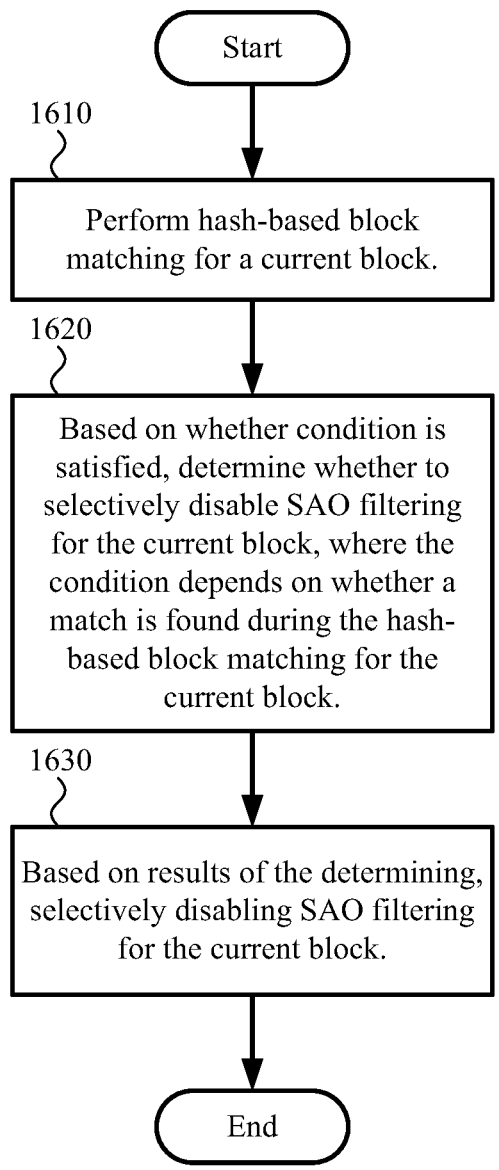
FIGS. 16 and 17 are flowcharts illustrating techniques for selectively disabling SAO filtering depending on the results of hash-based block matching.

FIG. 16 shows a generalized technique (1600) for selectively disabling SAO filtering depending on the results (e.g., matching hash values) of hash-based block matching. The technique (1600) can be performed by an encoder such as one described with reference to FIG. 3 or FIGS. 4a and 4b, or by another encoder.

The encoder encodes an image or video to produce encoded data, which the encoder outputs as part of a bitstream. During the encoding, the encoder performs (1610) hash-based block matching for a current block of a current picture. The current block can be a CTB of a CTU, or some other block. For example, the encoder determines a hash value for the current block, then attempts to find a match for it among multiple candidate blocks of one or more reference pictures. The encoder can evaluate a single reference picture (e.g., first reference picture in a reference picture list) or multiple reference pictures (e.g., each reference picture in the reference picture list). The match can signify matching hash values between the given block and one of the multiple candidate blocks. (That is, only hash values are checked.) Or, the match can further signify sample-by-sample matching between the given block and the one of the multiple candidate blocks. (That is, sample-wise comparisons confirm the match.) Considering hash values only is faster, but potentially less reliable since hash values from non-identical blocks can match. The hash-based block matching can use a hash table as described in section VI or use another hash table.

Based on whether a condition is satisfied, the encoder determines (1620) whether to disable SAO filtering for the current block. The condition depends on whether a match is found during the hash-based block matching for the current block (e.g., considering matching hash values, but not sample-wise comparisons). Reconstructed sample values may be different than the input sample values used to determine hash values. Thus, the condition can also depend on other factors, such as expected quality of the current block relative to quality of a candidate block for the match. Alternatively, the condition depends on other and/or additional factors.

The expected quality of the current block can be indicated by a quantization parameter ("QP") value that applies for the current block, and the quality of the candidate block can be indicated by a QP value that applies for the candidate block. The QP values can be picture QP values (QP value for the current picture versus QP value for the reference picture that includes the candidate block) or block-level QP values. If the candidate block (which matches the current block) covers parts of blocks that have different QP values, the QP value that applies for the candidate block can be (a) a smallest QP value among the different QP values for the blocks, (b) a QP value of whichever block covers a largest portion of the candidate block, (c) an average QP value among the different QP values for the blocks, (d) a weighted average QP value among the different QP values for the blocks, (e) a largest QP value among the different QP values for the blocks, or (f) some other QP value derived from one or more of the different QP values for the blocks.

In particular, as part of the condition, the encoder can check that the QP value for the current picture is greater than or equal to the QP value for the reference picture that includes the candidate block. Or, as part of the condition, the encoder can check that the QP value that applies for the current block is greater than or equal to the QP value that applies for the candidate block. If the QP value for the current picture is greater than or equal to the QP value for the reference picture, the expected error for the current picture is equivalent to or worse than the expected error for the reference picture. Similarly, if the QP value that applies for the current block is greater than or equal to the QP value that applies for the candidate block, the expected error for the current block is equivalent to or worse than the expected error for the candidate block. Alternatively, instead of checking QP values for the current block and candidate block, the encoder evaluates expected quality of the current block relative to quality of a candidate block for the match in some other way.

Based on results of the determining (1620), the encoder selectively disables (1630) SAO filtering for the current block. If SAO filtering is not disabled for the current block, the encoder can check one or more other conditions to decide whether to use SAO filtering for the current block and, if SAO filtering is used, determine parameters for SAO filtering for the current block. As part of the SAO determination process, the encoder can evaluate different options for type of SAO filter (edge offset or band offset), gradients, bands, offset values, etc.

The encoder can repeat the technique (1600) on a block-by-block basis for other blocks of a CTU, a slice or picture.

Figure 17:
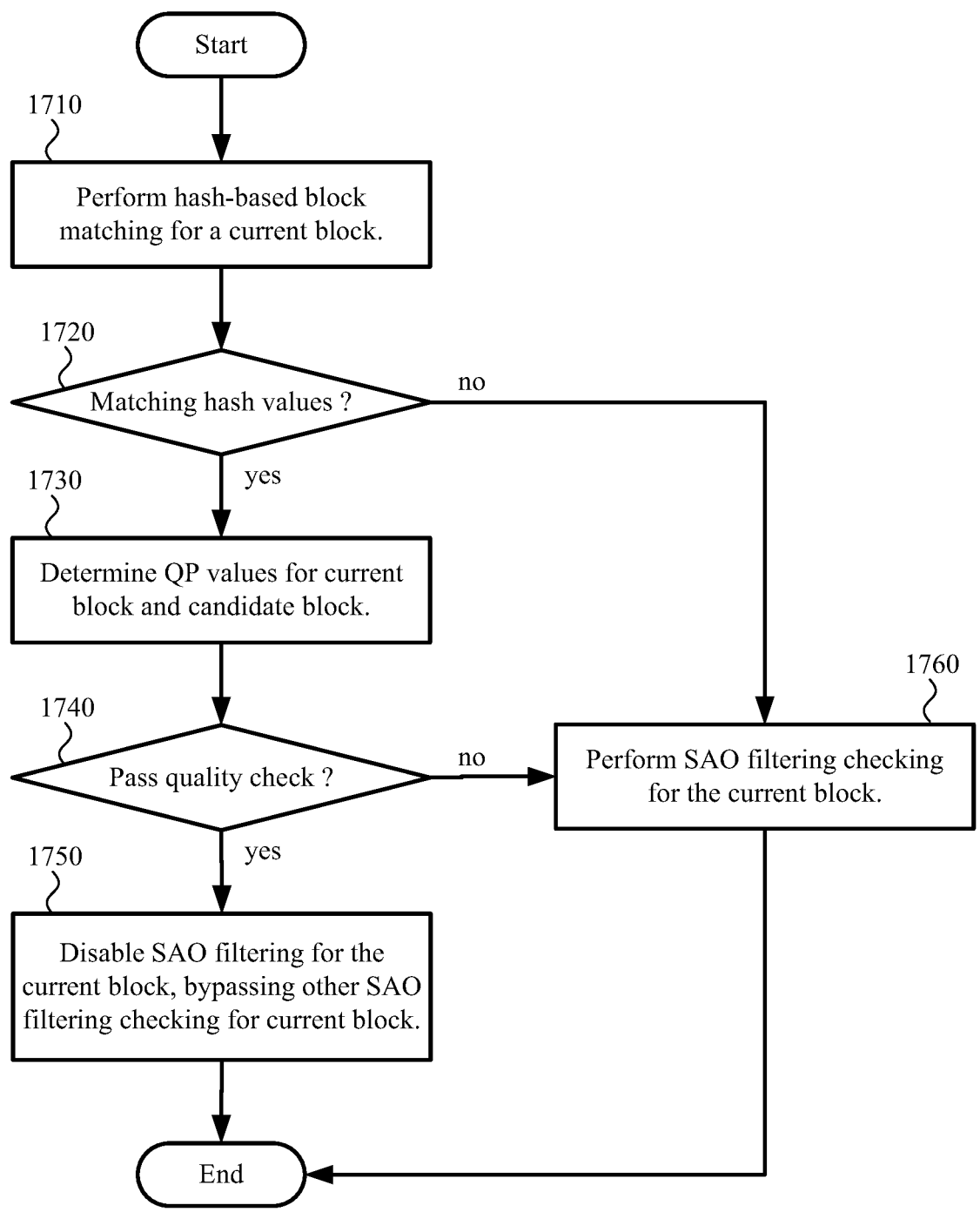

FIG. 17 illustrates a more detailed example technique (1700) for selectively disabling SAO filtering depending on the results of hash-based block matching. The technique (1700) can be performed by an encoder such as one described with reference to FIG. 3 or FIGS. 4a and 4b, or by another encoder.

During encoding, the encoder selectively disables SAO filtering for a current block of a current picture. The encoder performs (1710) hash-based block matching for the current block. For example, the encoder performs hash-based block matching using one of the hash tables described in section VI.

The encoder checks (1720) if hash-based block matching yields a match (here, matching hash values) for the current block. If the hash-based block matching yields a match, the encoder determines (1730) QP values for the current block and the candidate block (e.g., from picture-level, slice-level and/or CU-level QP values), then determines (1740) whether the candidate block passes a quality check (e.g., reconstruction quality of the candidate block (or reference picture) is not worse than the expected quality of the current block (or current picture)). If both checks (1720, 1740) are passed, the encoder disables (1750) SAO filtering for the current block, bypassing any other SAO filtering checking for the current block (according to one or more other conditions). Otherwise, if either of the two checks (1720, 1740) fails, the encoder performs (1760) SAO filtering checking for the current block. That is, if either of the two checks (1720, 1740) fails, the encoder can still determine whether SAO filtering should or should not be used for the current block (according to one or more other conditions) and, if SAO filtering is used, determine the parameters of SAO filtering for the current block.

The encoder can repeat the technique (1700) on a block-by-block basis for other blocks of a CTU, a slice or picture.

IX. Determining which Reference Pictures to Retain

This section presents various approaches to deciding which reference pictures to retain in a reference picture set ("RPS") depending on the results of hash-based block matching (e.g., matching hash values). By selecting reference pictures that facilitate effective motion-compensated prediction, these approaches can facilitate compression that is effective in terms of rate-distortion performance.

A. Reference Picture Sets.

A reference picture is, in general, a picture that contains samples that may be used for prediction in the decoding process of other pictures, which typically follow the reference picture in decoding order (also called coding order, coded order or decoded order). Multiple reference pictures may be available at a given time for use for motion-compensated prediction.

In general, an RPS is a set of reference pictures available for use in motion-compensated prediction. For a current picture, for example, an encoder or decoder determines an RPS that includes reference pictures in a decoded frame storage area such as a decoded picture buffer ("DPB"). The size of the RPS can be pre-defined or set according to a syntax element in a bitstream. For example, a syntax element indicates a constraint on the maximum number of reference pictures contained in the RPS. The reference pictures in the RPS may be adjacent in display order (also called temporal order) or separated from each other in display order. Also, a given reference picture in the RPS can precede a current picture in display order or follow the current picture in display order. During encoding and decoding, an RPS is updated—reference pictures in the RPS change from time to time to add newly decoded pictures and drop older pictures that are no longer used as reference pictures.

According to the H.265/HEVC standard, for a current picture, the RPS is a description of the reference pictures used in the decoding process of the current and future coded pictures. Reference pictures included in the RPS are listed explicitly in the bitstream. Specifically, the RPS includes reference pictures in multiple groups (also called RPS lists). The encoder can determine the RPS once per picture. For a current picture, the encoder determines groups of short-term reference pictures and long-term reference pictures that may be used in inter-picture prediction of the current picture and/or a following picture (in decoding order). Collectively, the groups of reference pictures define the RPS for the current picture. The encoder signals syntax elements in a slice segment header to indicate how the decoder should update the RPS for the current picture.

According to the H.265/HEVC standard, for the current picture, the decoder determines the RPS after decoding a slice segment header for a slice of the current picture, using syntax elements signaled in the slice header. Reference pictures are identified with picture order count ("POC") values, parts thereof and/or other information signaled in the bitstream. The decoder determines groups of short-term reference pictures and long-term reference pictures that may be used in inter-picture prediction of the current picture and/or a following picture (in decoding order), which define the RPS for the current picture.

FIG. 18 shows an example (1800) of updates to reference pictures of an RPS. The RPS includes up to four reference pictures, which are separated from each other in display order in FIG. 18. Alternatively, at least some of the reference pictures in the RPS can be adjacent in display order. In FIG. 18, three of the reference pictures in the RPS precede the current picture in display order, but one reference picture follows the current picture in display order. In FIG. 18, when picture 222 is the current picture, the RPS includes reference pictures 37, 156, 221 and 230. After picture 222 is encoded/decoded, the RPS is updated. Picture 221 is dropped from the RPS, and picture 222 is added to the RPS. Thus, when picture 223 is the current picture, the RPS includes reference pictures 37, 156, 222 and 230.

In general, a reference picture list ("RPL") is a list of reference pictures used for motion-compensated prediction. An RPL is constructed from the RPS. According to the H.265/HEVC standard, an RPL is constructed for a slice. Reference pictures in the RPL are addressed with reference indices. During encoding and decoding, when an RPL is constructed, reference pictures in the RPL can change to reflect changes to the RPS and/or to reorder reference pictures within the RPL to make signaling of the more commonly used reference indices more efficient. Typically, an RPL is constructed during encoding and decoding based upon available information about the RPL (e.g., available pictures in the RPS), modifications according to rules and/or modifications signaled in the bitstream.

The H.265/HEVC standard allows an encoder to decide which pictures are retained in an RPS, but does not define the patterns of reference pictures retained or criteria for retaining reference pictures. An encoder can apply a simple, fixed strategy such as dropping the oldest reference picture in the RPS, but that may result in dropping a useful reference picture. Sophisticated approaches to evaluating which reference pictures to retain can be computationally-intensive.

B. Updating an RPS Using Results of Hash-Based Block Matching.

This section describes computationally efficient and effective approaches to deciding which reference pictures to retain in an RPS. The approaches are adapted for encoding of artificially-created video content, but can also be applied for other types of video content.

FIG. 19 shows a generalized technique (1900) for deciding which reference pictures to retain in an RPS depending on the results (e.g., matching hash values) of hash-based block matching. The technique (1900) can be performed by an encoder such as one described with reference to FIG. 3 or FIGS. 4a and 4b, or by another encoder.

The encoder encodes (1910) video to produce encoded data and outputs (1920) the encoded data in a bitstream. As part of the encoding (1910), the encoder determines which of multiple reference pictures to retain in an RPS based at least in part on the results of hash-based block matching. For example, the multiple reference pictures include one or more previous reference pictures, which were previously in the RPS for encoding of a current picture, as well as a current reference picture that is a reconstructed version of the current picture. To determine which reference pictures to retain in an RPS, the encoder can use the approach shown in FIG. 20, the approach shown in FIG. 21, or another approach.

For example, suppose an RPS includes at most four reference pictures. The RPS can include references pictures $pic_{ref1}$, $pic_{ref2}$, $pic_{ref3}$ and $pic_{ref4}$ for encoding of a current picture. When encoding the next picture, the encoder updates the RPS. A reconstructed version of the current picture ($pic_{current}$) can be added to the RPS, in which case one of the reference pictures previously in the RPS is dropped if the capacity of the RPS is exceeded. For example, any four of $pic_{ref1}$, $pic_{ref2}$, $pic_{ref3}$, $pic_{ref4}$ and $pic_{current}$ can be included in the RPS, and the remaining picture is dropped.

Figure 20:
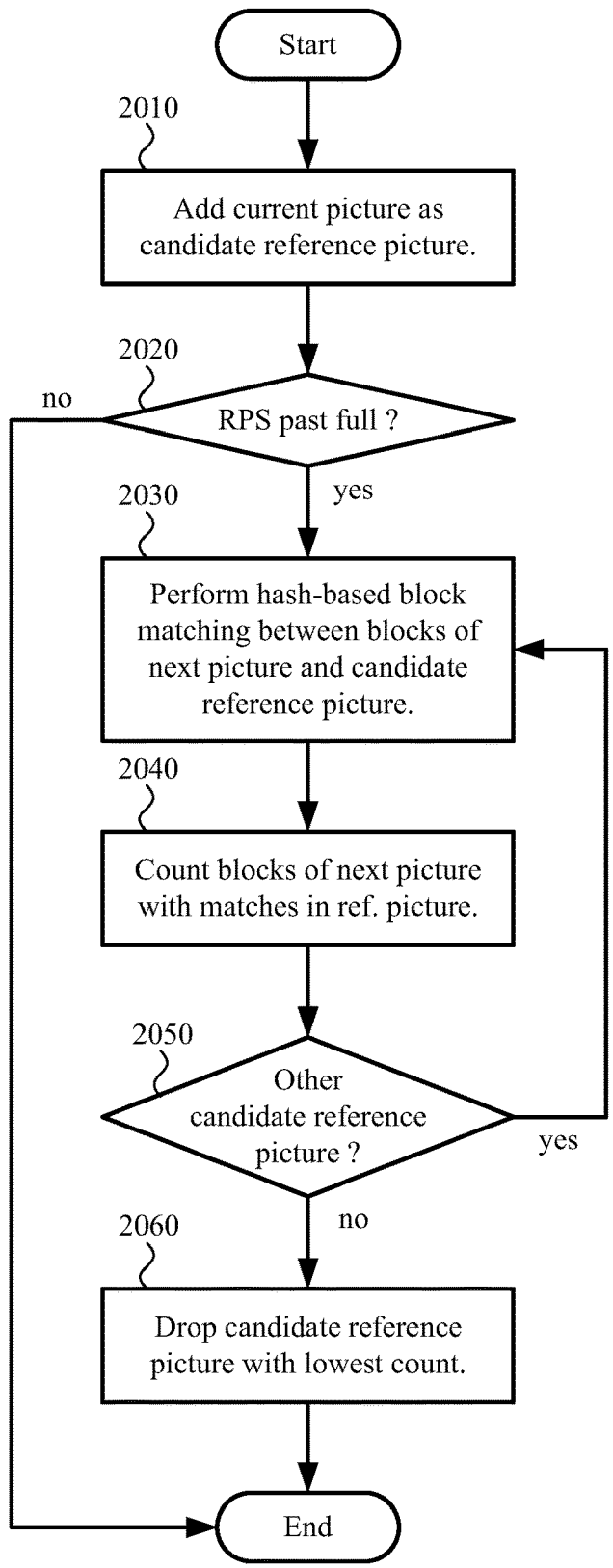
Figure 21:
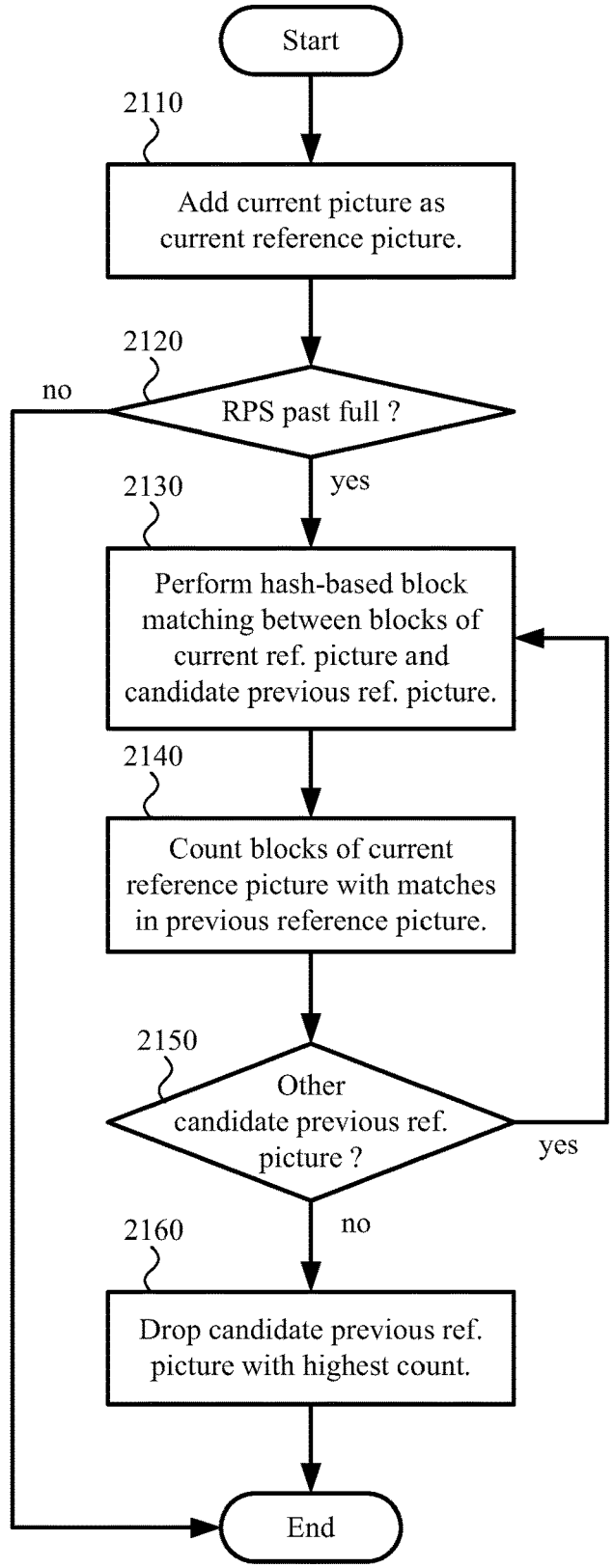

In the approaches shown in FIGS. 20 and 21, hash values for the hash-based block matching are computed from input sample values for a picture, whether the picture is a next picture, current picture (current reference picture) or previous reference picture. That is, even though the encoder is making decisions about reference pictures, which include reconstructed sample values, the hash values are computed from input sample values for those pictures.

FIG. 20 shows a first example technique (2000) for deciding which reference pictures to retain in an RPS depending on the results on hash-based block matching. The technique (2000) can be performed by an encoder such as one described with reference to FIG. 3 or FIGS. 4a and 4b, or by another encoder.

In general, in the approach shown in FIG. 20, if the RPS is already full when the current picture has been encoded, the encoder drops the candidate reference picture that is expected to be least effective in predicting the next picture. The encoder evaluates the candidate reference pictures (current reference picture and previous reference pictures) in succession. For each of the candidate reference pictures, the encoder uses hash-based block matching to estimate how well the candidate reference picture predicts the next picture. After evaluating the candidate reference pictures, the encoder drops the candidate reference picture that is expected to predict the next picture worst. On the other hand, if the RPS is not full, the encoder can simply add the current picture to the RPS as a new reference picture and retain the previous reference pictures. Typically, the approach shown in FIG. 20 retains in the RPS those candidate reference pictures best suited for motion-compensated prediction of the next picture, but the retained reference pictures might not be as useful for motion-compensated prediction of pictures further in the future (e.g., after a scene change).

As shown in FIG. 20, the encoder adds (2010) the current picture as a candidate reference picture. The encoder checks (2020) whether the RPS, counting the current picture (current reference picture) and previous reference pictures as candidate reference pictures, would be past full. If not, the updated RPS includes the previous reference pictures, if any, and the current picture (current reference picture), and the technique (2000) ends.

Otherwise (RPS was already at capacity with the previous reference pictures), the encoder determines which candidate reference picture to drop. For a given candidate reference picture, the encoder performs (2030) hash-based block matching between blocks of the next picture and the candidate reference picture. For example, the encoder splits the next picture into M×N blocks (where the M×N blocks can be 8×8 blocks or blocks of some other size), and attempts to find matching hash values for the respective blocks of the next picture and candidate blocks of the candidate reference picture. The encoder counts (2040) blocks of the next picture with matches in the candidate reference picture (e.g., matching hash values from the hash-based block matching, without sample-wise comparisons). A count value $count_{cand\_x}$ indicates how many of the blocks of the next picture have matching blocks in the candidate reference picture.

The encoder checks (2050) whether to continue with another candidate reference picture. If so, the encoder performs (2030) hash-based block matching between blocks of the next picture and the other candidate reference picture. Thus, the encoder evaluates the previous reference pictures in the RPS (from encoding of the current picture) as well as the current reference picture (after reconstruction of the current picture) as candidate reference pictures. After determining counts of matches for all of the candidate reference pictures, the encoder drops (2060) the candidate reference picture with the lowest count.

For example, the encoder evaluates $pic_{ref1}$, $pic_{ref2}$, $pic_{ref3}$, $pic_{ref4}$ and $pic_{current}$ as candidate reference pictures, performing (2030) hash-based block matching for blocks of the next picture. The encoder determines (2040) count values $count_{cand\_ref1}$, $count_{cand\_ref2}$, $count_{cand\_ref3}$, $count_{cand\_ref4}$ and $count_{cand\_current}$ for the respective candidate reference pictures. The encoder determines which of $count_{cand\_ref1}$, $count_{cand\_ref2}$, $count_{cand\_ref3}$, $count_{cand\_ref4}$ and $count_{cand\_current}$ is lowest, and drops (2060) the candidate reference picture having the lowest count.

The encoder can repeat the technique (2000) on a picture-by-picture basis.

FIG. 21 shows a second example technique (2100) for deciding which reference pictures to retain in an RPS depending on results on hash-based block matching. The technique (2100) can be performed by an encoder such as one described with reference to FIG. 3 or FIGS. 4a and 4b, or by another encoder.

In general, in the approach shown in FIG. 21, if the RPS is already full when the current picture has been encoded, the encoder adds the current picture (current reference picture) to the RPS but drops the candidate previous reference picture that is estimated to be most similar to the current picture (current reference picture). This tends to maintain diversity among the reference pictures in the RPS. The encoder evaluates the candidate previous reference pictures in succession. For each of the candidate previous reference pictures (which were in the RPS for encoding of the current picture), the encoder uses hash-based block matching to estimate similarity to the current reference picture. After evaluating the candidate previous reference pictures, the encoder drops the candidate previous reference picture that is estimated to be most similar to the current reference picture. On the other hand, if the RPS is not full, the encoder can simply add the current reference picture to the RPS as a new reference picture and retain the previous reference pictures. In this way, the approach shown in FIG. 21 can retain in the RPS reference pictures that are useful for motion-compensated prediction even if future pictures change significantly (e.g., after a scene change).

As shown in FIG. 21, the encoder adds (2110) the current picture as a current reference picture. Compared to the next picture to be encoded, the current reference picture tends to have small temporal differences and a high correlation, so the encoder retains it as a reference picture. The encoder checks (2120) whether the RPS, counting the current reference picture and previous reference pictures as candidate reference pictures, would be past full. If not, the new RPS includes the previous reference pictures, if any, and the current reference picture, and the technique (2100) ends.

Otherwise (RPS was already at capacity with the previous reference pictures), the encoder determines which candidate previous reference picture to drop. For a given candidate previous reference picture, the encoder performs (2130) hash-based block matching between blocks of the current reference picture and the candidate previous reference picture. For example, the encoder splits the current reference picture into M×N blocks (where the M×N blocks can be 8×8 blocks or blocks of some other size), and attempts to find matching hash values for the respective blocks of the current reference picture and candidate blocks of the candidate previous reference picture. The encoder counts (2140) blocks of the current reference picture with matches in the candidate previous reference picture (e.g., matching hash values from the hash-based block matching, without sample-wise comparisons). A count value $count_{cand\_x}$ indicates how many of the blocks of the current reference picture have matching blocks in the candidate previous reference picture.

The encoder checks (2150) whether to continue with another candidate previous reference picture. If so, the encoder performs (2130) hash-based block matching between blocks of the current reference picture and the other candidate previous reference picture. Thus, the encoder evaluates the previous reference pictures in the RPS (from encoding of the current picture) as candidate previous reference pictures. After determining counts of matches for all of the candidate previous reference pictures, the encoder drops (2160) the candidate previous reference picture with the highest count.

For example, the encoder evaluates $pic_{ref1}$, $Pic_{ref2}$, $pic_{ref3}$ and $pic_{ref4}$ as candidate reference pictures, performing (2130) hash-based block matching for blocks of the current reference picture. The encoder determines (2140) count values $count_{cand\_ref1}$, $count_{cand\_ref2}$, $count_{cand\_ref3}$ and $count_{cand\_ref4}$, for the respective candidate previous reference pictures. The encoder determines which of $count_{cand\_ref1}$, $count_{cand\_ref2}$, $count_{cand\_ref3}$ and $count_{cand\_ref4}$ is highest, and drops (2160) the candidate previous reference picture having the highest count.

The encoder can repeat the technique (2100) on a picture-by-picture basis.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising one or more processing units and memory, wherein the computing device implements an encoder system comprising:
a video encoder configured to encode video to produce encoded data, wherein the video encoder is configured to determine a motion vector ("MV") precision for a unit of the video based at least in part on results of hash-based block matching by performing operations that include:
splitting the unit into multiple blocks;
determining a first measure of a total number of the multiple blocks of the unit;
determining a second measure of a number of the multiple blocks of the unit that have matching blocks identified in the hash-based block matching;
determining a third measure of a number of the multiple blocks of the unit that contain camera video content as opposed to artificially-created video content, as indicated by a pattern of uniform sample values;
determining that the second measure satisfies a matched block threshold and, as a result and based at least in part on the first measure and the third measure, selecting integer-sample MV precision for the unit; and
using the selected integer-sample MV precision when encoding the unit without performing interpolation of sample values at fractional-sample positions; and
a buffer configured to store the encoded data for output in a bitstream.

2. The computing device of claim 1 wherein, for the hash-based block matching, the video encoder is configured to:
for a given block of the multiple blocks of the unit:
determine a hash value for the given block; and
determine whether there is a match among multiple candidate blocks of one or more reference pictures based at least in part on the hash value for the given block.

3. The computing device of claim 2 wherein the match signifies matching hash values between the given block and one of the multiple candidate blocks.

4. The computing device of claim 3 wherein the match further signifies sample-by-sample matching between the given block and the one of the multiple candidate blocks.

5. The computing device of claim 1 wherein, for the hash-based block matching, the video encoder is configured to compare hash values computed from input sample values of the unit and from input sample values for one or more reference pictures.

6. The computing device of claim 1 wherein the unit is selected from a group consisting of sequence, series of pictures between scene changes, group of pictures, picture, tile, slice and coding unit, and wherein the MV precision is selected from a group consisting of integer-sample MV precision and quarter-sample MV precision.

7. The computing device of claim 1 wherein the second measure is the number of the multiple blocks of the unit that have matching blocks identified in the hash-based block matching.

8. The computing device of claim 1 wherein the second measure is a rate equal to (a) the number of the multiple blocks of the unit that have matching blocks identified in the hash-based block matching divided by (b) the total number of the multiple blocks of the unit.

9. The computing device of claim 1 wherein the unit is a picture and the multiple blocks are 8×8 blocks of the picture.

10. In a computing device, a method comprising:
encoding an image or video to produce encoded data, including:
performing hash-based block matching for a current block of a current picture including:
determining a hash value for the current block; and
attempting to find a match among multiple candidate blocks of one or more reference pictures based at least in part on the hash value for the current block;
using results of the hash-based block matching for the current block to determine whether to disable or enable sample adaptive offset ("SAO") filtering for the current block, wherein the results of the hash-based block matching for the current block include whether the match is found during the hash-based block matching for the current block; and
based on results of the determining whether to disable or enable SAO filtering for the current block, selectively disabling or enabling the SAO filtering for the current block, including performing the SAO filtering for the current block if no match is found during the hash-based block matching for the current block; and
outputting the encoded data in a bitstream.

11. The method of claim 10 wherein the determining whether to disable or enable SAO filtering for the current block also uses expected quality of the current block relative to quality of a candidate block, among the multiple candidate blocks, for the match.

12. The method of claim 11 wherein the expected quality of the current block is indicated by a quantization parameter ("QP") value that applies for the current block, and wherein the quality of the candidate block for the match is indicated by a QP value that applies for the candidate block for the match.

13. The method of claim 10 wherein the encoding further comprises:
if the SAO filtering is enabled for the current block, determining parameters for the SAO filtering for the current block.

14. The method of claim 10 wherein the current block is a coding tree block of a coding tree unit, and wherein the SAO filtering is also selectively disabled or enabled for one or more other coding tree blocks of the coding tree unit.

15. The method of claim 10 wherein, for the hash-based block matching, hash values are computed from input sample values of the current block of the current picture and from input sample values of the multiple candidate blocks of the one or more reference pictures.

16. One or more computer-readable memory or storage devices storing computer-executable instructions for causing a processing unit, when programmed thereby, to perform operations comprising:
encoding video to produce encoded data, including determining which of multiple reference pictures to retain in a reference picture set, available for use in motion-compensated prediction, based at least in part on results of hash-based block matching, wherein the determining which of the multiple reference pictures to retain includes:

for each reference picture of the multiple reference pictures, using the hash-based block matching to estimate how well that reference picture predicts a given picture; and dropping, from the reference picture set, a reference picture of the multiple reference pictures that is expected to predict the given picture worse than other ones of the multiple reference pictures, thereby making the dropped reference picture unavailable for use in motion-compensated prediction; and outputting the encoded data in a bitstream.

17. The one or more computer-readable memory or storage devices of claim 16 wherein, for each reference picture of the multiple reference pictures, a count indicates how many of the blocks of the given picture have matching blocks in that reference picture, and wherein the dropped reference picture is the one of the multiple reference pictures having lowest count.

18. The one or more computer-readable memory or storage devices of claim 16 wherein, for the hash-based block matching, hash values are computed from input sample values of the given picture and from input sample values for the multiple reference pictures.

19. The one or more computer-readable memory or storage devices of claim 16 wherein the encoding further comprises checking whether the reference picture set is past full.

* * * * *